United States Patent
Suvarna et al.

(10) Patent No.: US 11,949,596 B1
(45) Date of Patent: Apr. 2, 2024

(54) LOCALIZED CONGESTION MITIGATION FOR INTERIOR GATEWAY PROTOCOL (IGP) NETWORKS

(71) Applicant: Cisco Technology, Inc., San Jose, CA (US)

(72) Inventors: Navin Ashok Suvarna, Holly Springs, NC (US); Sridhar Vaidyanathan, Mumbai (IN); Praveen Shrinivas Poojary, Jersey city, NJ (US); Dhrumil Prajapati, Apex, NC (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 18/353,649

(22) Filed: Jul. 17, 2023

(51) Int. Cl.
*H04L 47/122* (2022.01)
*H04L 43/0882* (2022.01)
*H04L 47/125* (2022.01)

(52) U.S. Cl.
CPC ........ *H04L 47/122* (2013.01); *H04L 43/0882* (2013.01); *H04L 47/125* (2013.01)

(58) Field of Classification Search
CPC . H04L 47/122; H04L 47/125; H04L 43/0882; H04L 43/08; H04L 43/0876; H04L 43/16
See application file for complete search history.

(56) References Cited

U.S. PATENT DOCUMENTS

| | | | |
|---|---|---|---|
| 7,203,191 B2 * | 4/2007 | Garcia-Luna-Aceves | H04L 47/125 370/389 |
| 11,451,478 B1 | 9/2022 | Torvi et al. | |
| 2013/0286846 A1 | 10/2013 | Atlas et al. | |
| 2014/0119193 A1 * | 5/2014 | Anand | H04L 47/125 370/237 |
| 2015/0263959 A1 | 9/2015 | Patwardhan et al. | |

(Continued)

FOREIGN PATENT DOCUMENTS

| | | | | |
|---|---|---|---|---|
| CN | 111684768 A | * | 9/2020 | ......... H04L 43/0882 |
| EP | 1263173 A1 | * | 12/2002 | ............. H04L 45/02 |
| WO | WO-2023069757 A1 | * | 4/2023 | |

OTHER PUBLICATIONS

"Local Congestion Mitigation (LCM) White Paper," Cisco White Paper, Sep. 1, 2021. (Year: 2021).*

(Continued)

*Primary Examiner* — Alina A Boutah
(74) *Attorney, Agent, or Firm* — Lee & Hayes, P.C.

(57) ABSTRACT

Data defining egress bandwidth utilization on an interface of a node may be obtained and a congestion event may be detected based at least in part on an average interface utilization (Y) being greater than a first threshold (X1). A plurality of alternate links that can accommodate excess bandwidth without exceeding the first threshold may be identified. Flows associated with the plurality of alternate links may be filtered based at least in part on business logic macro flow filtering. It may be determined whether the plurality of alternate links pass a diffusing update algorithm (DUAL)-based loop-free path-finding algorithm (LPA) analysis for the destination node prefixes whether the destination node prefixes pass the DUAL-based LPA analysis for the at least one of the plurality of alternate links and a plurality of next hops associated with the at least one of the plurality of alternate links.

20 Claims, 13 Drawing Sheets

(56) References Cited

U.S. PATENT DOCUMENTS

| | | | |
|---|---|---|---|
| 2016/0080502 A1* | 3/2016 | Yadav | H04L 12/4633 |
| | | | 709/227 |
| 2016/0337223 A1* | 11/2016 | Mackay | H04L 43/0894 |
| 2019/0245787 A1* | 8/2019 | Skalecki | H04L 47/35 |
| 2020/0366613 A1 | 11/2020 | Skalecki et al. | |
| 2022/0321476 A1* | 10/2022 | Williams | H04L 47/11 |

OTHER PUBLICATIONS

J. J. Garcia-Lunes-Aceves, "Loop-Free Routing Using Diffusing Computations," IEEE/ACM Transactions On Networking, vol. 1, No. 1, Feb. 1993 (Year: 1993).*

Zhao et al., "A More Efficient Diffusing Update Algorithm For Loop-Free Routing," School of Electronic Engineering Beijing University of Posts and Telecommunications, Beijing, China (Year: 2023).*

Cisco "Use Local Congestion Mitigation (LCM) to Mitigate Network Congestion Locally" 2022, 16 pages.

Cisco, "Understanding CEF Weight Distributions In Unequal-cost Load Sharing", https://www.cisco.com/c/en/us/support/docs/ios-nx-os-software/ios-xr-software/213936-understanding-cef-weight-distributions-i.html, Nov. 28, 2018, 12 pages.

Cisco, "Cisco Crosswork Network Automation", downloaded from https://www.cisco.com/c/en/us/products/cloud-systems-management/crosswork-network-automation/index.html on Jul. 17, 2023, 10 pages.

* cited by examiner

LOCALIZED CONGESTION MITIGATION FOR INTERIOR GATEWAY PROTOCOL (IGP) NETWORKS

TECHNICAL FIELD

The present disclosure relates generally to computer networks. Specifically, the present disclosure relates to systems and methods for mitigating localized congestion by transitioning to unequal cost multipath (UCMP) load-balancing for interior gateway protocol (IGP) networks and/or overlay networks.

BACKGROUND

Computing networks are ubiquitous and may include a number of computing devices that may be referred to as nodes of the network. The nodes may share resources and transmit data between the nodes. The proliferation of computing devices and the formation of computing networks along with increase in traffic and bandwidth consumption has resulted in congestion events within the network and has driven the need for real time congestion management techniques. The network may experience dynamic network states that increase risk of congestion which, in turn, leads to degraded service levels and user-experience. Further, re-optimization for congestion mitigation based on manual network changes made by, for example, an administrator, may be error-prone, lacks scalability, and places significant risks to defined service-level agreements (SLAs) and delays a mean time to repair (MTTR). Further, the options for automated re-optimization are non-existent for interior gateway protocol (IGP) as compared to segment-routing traffic engineering (SR-TE) and/or resource reservation protocol traffic engineering (RSVP-TE) where options for automated re-optimization of a network for congestion mitigation have been developed. Therefore, there is a need for delivering enhanced operational agility and providing swift handling of congestion events in an automated way to detect and mitigate congestion events and consequently deliver better user experience, minimize impact to service levels, and support optimal utilization of network capacity.

Relatively higher bandwidth links within a network may have lower IGP metrics and/or may be cost configured. This results in the formation and utilization of the shortest IGP paths within the network. While there may be alternate links within the network, each with a relatively higher cost, that may be utilized to reach from a source node to a destination node, only the low-cost link(s) are utilized since they are more effective in transmitting data. As a result, this may cause polarization of traffic within those low-cost links and may render a number of the alternate links that may be used as traffic flows under-utilized in the event of congestion of the primary low-cost link(s). This, in turn, may cause degradation of services and/or user experience.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
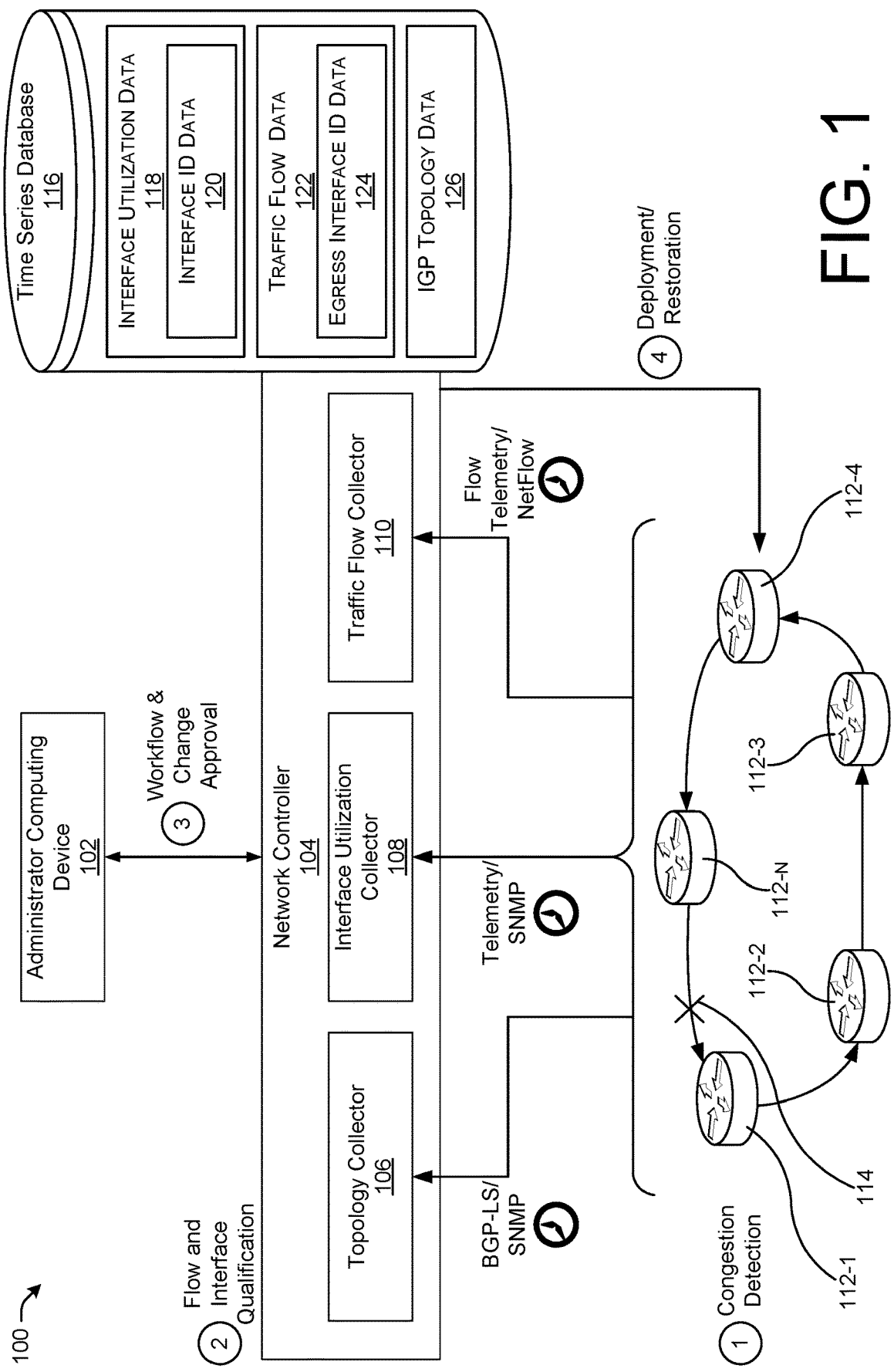
FIG. 1 illustrates a system-architecture diagram of a network that utilizes a network controller to orchestrate congestion mitigation, according to an example of the principles described herein.

This disclosure describes systems, methods, and non-transitory computer-readable medium to mitigate localized congestion for interior gateway protocol (IGP) networks. As mentioned above, the polarization of traffic within low-cost links may render a number of the alternate links within the network that may otherwise be used as traffic flows under-utilized in the event of congestion of the primary low-cost link(s). This, in turn, may cause degradation of services and/or user experience. The expected behavior in this scenario should be to locally distribute the excess load to the alternate links on the node undergoing congestion. Further, another objective is to ensure loop-free handling of redirected traffic while mitigating the congestion. Still further, another objective is to provide revertive action if and when the congestion event in the original, mitigated-for node is cleared and no longer an issue within the network.

Therefore, the present disclosure describes offloading of traffic from a primary IGP link(s) undergoing congestion and locally distribute the traffic to alternate link(s) on the node. The methods may include utilizing a network controller to orchestrate a conditional local unequal cost multi-path (UCMP) load-balancing policy and associated processes that provide maximum variance on the node undergoing link congestion. The network controller may qualify traffic flow and node interface data for mitigation.

Examples described herein provide a non-transitory computer-readable medium storing instructions that, when executed, causes a processor to perform operations. The operations may include obtaining data defining egress bandwidth utilization on an interface of a node, detecting a congestion event based at least in part on an average interface utilization (Y) being greater than a first threshold ($X_1$), and determining a plurality of alternate links that can accommodate excess bandwidth without exceeding the first threshold. The operations may further include identifying destination node prefixes of first filtered flows associated with the plurality of alternate links that are filtered based at least in part on business logic macro flow filtering and determining if the plurality of alternate links pass a diffusing update algorithm (DUAL)-based loop-free path-finding algorithm (LPA) analysis for the destination node prefixes. The operations may further include, based at least in part on at least one of the plurality of alternate links passes the DUAL-based LPA analysis for the destination node prefixes, determining if the destination node prefixes pass the DUAL-based LPA analysis for the at least one of the plurality of alternate links and a plurality of next hops associated with the at least one of the plurality of alternate links. The operations may further include, based at least in part on the destination node prefixes passing the DUAL-based LPA analysis for the at least one of the plurality of alternate links and the plurality of next hops associated with the at least one of the plurality of alternate links, calculating a flow bandwidth for the first filtered flows. The operations may further include filtering the first filtered flows based at least in part on the flow bandwidth to obtain second filtered flows, the second filtered flows defining a first link among the at least one of the plurality of alternate links and implementing a mitigation plan based at least in part on the first link.

The operations may further include restoring the mitigation plan to a pre-mitigation state comprising capturing egress bandwidth utilization on the interface for which the mitigation plan is implemented. The operations may further include initializing a congestion check interval ($T_C$) and determining if the average interface utilization (Y) at the interface is less than a second threshold ($X_2$) relatively lower than the first threshold ($X_1$). The operations may further include, based at least in part on a determination that the average interface utilization (Y) is less than the second threshold ($X_2$), capturing user input for a revertive response. The operations may further include, based at least in part on a determination that the average interface utilization (Y) is not less than the second threshold ($X_2$), capturing egress bandwidth utilization metrics on the interface. The operations may further include, based at least in part on the user input for the revertive response reverting traffic moving through the first link to a pre-mitigation link and removing an access list from the node.

The operations may further include capturing egress bandwidth utilization metrics on the interface of the node and initializing a congestion check interval ($T_C$) during which the detecting of the congestion event is performed.

The detecting of the congestion event further includes, based at least in part on the average interface utilization (Y) being greater than the first threshold ($X_1$), identifying the congestion event, and, based at least in part on the average interface utilization (Y) not being greater than the first threshold ($X_1$), capturing egress bandwidth utilization metrics on the interface based at least in part on the average interface utilization (Y) being not greater than first threshold ($X_1$).

The operations may further include identifying the alternate links on the node and, based at least in part on a determination that the plurality of alternate links cannot accommodate excess bandwidth without exceeding the first threshold ($X_1$), recording the interface of the node for consideration for exclusion as one of the plurality of alternate links. The operations may further include excluding the interface of the node as a candidate one of the plurality of alternate links.

The operations may further include capturing user input for mitigation response and, based at least in part on a response to the user input, identifying excess bandwidth (Z) where the excess bandwidth (Z) is equal to the average interface utilization (Y) minus the first threshold ($X_1$). The operations may further include identifying all flows passing through the interface during a congestion check interval ($T_C$), obtaining destination addresses of the first filtered flows, and identifying the destination node prefixes from the destination addresses.

The operations may further include capturing user input for mitigation response, and, based at least in part on a response to the user input, identifying excess bandwidth (Z) where the excess bandwidth (Z) is equal to the average interface utilization (Y) minus the first threshold ($X_1$). The operations may further include identifying all flows passing through the interface in a congestion check interval ($T_C$) and identifying the destination node prefixes (egress label switching router(s) (LSRs)) for the first filtered flows using flow top label to prefix mapping.

The operations may further include, based at least in part on the plurality of alternate links not passing the DUAL-based LPA analysis for the destination node prefixes, recording the interface of the node for consideration for exclusion as one of the plurality of alternate links and excluding the interface of the node as a candidate one of the plurality of alternate links.

The operations may further include, based at least in part on a first one of the destination node prefixes not passing the DUAL-based LPA analysis for the plurality of alternate links and the plurality of next hops associated with the plurality of alternate links, excluding at least one of the first filtered flows corresponding to the first one of the destination node prefixes.

The operations may further include, based at least in part on a first one of the destination node prefixes passing the DUAL-based LPA analysis for the plurality of alternate links and the plurality of next hops associated with the plurality of alternate links, recording at least one of the first filtered flows corresponding to the first one of the destination node prefixes as a candidate for flow mitigation and calculating flow bandwidths for the recorded first filtered flows in a congestion check interval ($T_C$) time window. The operations may further include arranging the recorded first filtered flows in ascending order of the flow bandwidths and presenting the mitigation plan to a user. The operations may further include, based at least in part on a response from the user regarding the mitigation plan, pushing flow information to an access list of the node and enabling the mitigation plan based on the access list. The filtering of the first filtered flows based at least in part on the flow bandwidth to obtain the second filtered flows comprises filtering the first filtered flows that have bandwidth that is cumulatively equal to or rounded to a higher value of excess traffic (Z).

Examples described herein also provide a network controller include a processor and a non-transitory computer-readable media storing instructions that, when executed by the processor, causes the processor to perform operations.

The operations may include obtaining data defining egress bandwidth utilization on an interface of a node, detecting a congestion event based at least in part on an average interface utilization (Y) being greater than a first threshold ($X_1$), and determining a plurality of alternate links that can accommodate excess bandwidth without exceeding the first threshold. The operations may further include identifying destination node prefixes of first filtered flows associated with the plurality of alternate links that are filtered based at least in part on business logic macro flow filtering and determining if the plurality of alternate links pass a diffusing update algorithm (DUAL)-based loop-free path-finding algorithm (LPA) analysis for the destination node prefixes. The operations may further include, based at least in part on at least one of the plurality of alternate links passes the DUAL-based LPA analysis for the destination node prefixes, determining if the destination node prefixes pass the DUAL-based LPA analysis for the at least one of the plurality of alternate links and a plurality of next hops associated with the at least one of the plurality of alternate links. The operations may further include, based at least in part on the destination node prefixes passing the DUAL-based LPA analysis for the at least one of the plurality of alternate links and the plurality of next hops associated with the at least one of the plurality of alternate links, calculating a flow bandwidth for the first filtered flows. The operations may further include filtering the first filtered flows based at least in part on the flow bandwidth to obtain second filtered flows, the second filtered flows defining a first link among the at least one of the plurality of alternate links and implementing a mitigation plan based at least in part on the first link.

The operations may further include restoring the mitigation plan to a pre-mitigation state including capturing egress bandwidth utilization on the interface for which the mitigation plan is implemented, initializing a congestion check interval ($T_C$), and determining if the average interface utilization (Y) at the interface is less than a second threshold ($X_2$) relatively lower than the first threshold ($X_1$). The operations may further include, based at least in part on a determination that the average interface utilization (Y) is less than the second threshold ($X_2$), capturing user input for a revertive response. The operations may further include, based at least in part on a determination that the average interface utilization (Y) is not less than the second threshold ($X_2$), capturing egress bandwidth utilization metrics on the interface. The operations may further include, based at least in part on the user input for the revertive response reverting traffic moving through the first link to a pre-mitigation link, and removing an access list from the node.

The operations may further include capturing egress bandwidth utilization metrics on the interface of the node and initializing a congestion check interval ($T_C$) during which the detecting of the congestion event is performed. The operations may further include, based at least in part on the average interface utilization (Y) being greater than the first threshold ($X_1$), identifying the congestion event. The operations may further include, based at least in part on the average interface utilization (Y) not being greater than the first threshold ($X_1$), capturing egress bandwidth utilization metrics on the interface based at least in part on the average interface utilization (Y) being not greater than first threshold ($X_1$). The operations may further include capturing user input for mitigation response, and, based at least in part on a response to the user input, identifying excess bandwidth (Z) where the excess bandwidth (Z) is equal to the average interface utilization (Y) minus the first threshold ($X_1$). The operations may further include identifying all flows passing through the interface during a congestion check interval ($T_C$) and identifying the destination node prefixes.

The operations may further include, based at least in part on a first one of the destination node prefixes passing the DUAL-based LPA analysis for the plurality of alternate links and the plurality of next hops associated with the plurality of alternate links, recording at least one of the first filtered flows corresponding to the first one of the destination node prefixes as a candidate for flow mitigation. The operations may further include calculating flow bandwidths for the recorded first filtered flows in a congestion check interval ($T_C$) time window and arranging the recorded first filtered flows in ascending order of the flow bandwidths. The operations may further include presenting the mitigation plan to a user. The operations may further include, based at least in part on a response from the user regarding the mitigation plan, pushing flow information to an access list of the node and enabling the mitigation plan based on the access list.

Examples described herein also provide a method of congestion mitigation, including obtaining data defining egress bandwidth utilization on an interface of a node, detecting a congestion event based at least in part on an average interface utilization (Y) being greater than a first threshold ($X_1$), and determining a plurality of alternate links that can accommodate excess bandwidth without exceeding the first threshold. The method may further include identifying destination node prefixes of first filtered flows associated with the plurality of alternate links that are filtered based at least in part on business logic macro flow filtering and determining if the plurality of alternate links pass a diffusing update algorithm (DUAL)-based loop-free path-finding algorithm (LPA) analysis for the destination node prefixes. The method may further include, based at least in part on at least one of the plurality of alternate links passes the DUAL-based LPA analysis for the destination node prefixes, determining if the destination node prefixes pass the DUAL-based LPA analysis for the at least one of the plurality of alternate links and a plurality of next hops associated with the at least one of the plurality of alternate links. The method may further include, based at least in part on the destination node prefixes passing the DUAL-based LPA analysis for the at least one of the plurality of alternate links and the plurality of next hops associated with the at least one of the plurality of alternate links, calculating a flow bandwidth for the first filtered flows. The method may further include filtering the first filtered flows based at least in part on the flow bandwidth to obtain second filtered flows, the second filtered flows defining a first link among the at least one of the plurality of alternate links and implementing a mitigation plan based at least in part on the first link.

The method may further include rising restoring the mitigation plan to a pre-mitigation state including capturing egress bandwidth utilization on the interface for which the mitigation plan is implemented, initializing a congestion check interval ($T_C$), and determining if the average interface utilization (Y) at the interface is less than a second threshold ($X_2$) relatively lower than the first threshold ($X_1$). The method may further include, based at least in part on a determination that the average interface utilization (Y) is less than the second threshold ($X_2$), capturing user input for a revertive response. The method may further include, based at least in part on a determination that the average interface utilization (Y) is not less than the second threshold ($X_2$), capturing egress bandwidth utilization metrics on the interface. The method may further include, based at least in part on the user input for the revertive response, reverting traffic moving through the first link to a pre-mitigation link and removing an access list from the node.

The method may further include capturing egress bandwidth utilization metrics on the interface of the node and initializing a congestion check interval ($T_C$) during which the detecting of the congestion event is performed. The method may further include, based at least in part on the average interface utilization (Y) being greater than the first threshold ($X_1$), identifying the congestion event. The method may further include, based at least in part on the average interface utilization (Y) not being greater than the first threshold ($X_1$), capturing egress bandwidth utilization metrics on the interface based at least in part on the average interface utilization (Y) being not greater than first threshold ($X_1$) and capturing user input for mitigation response. The method may further include, based at least in part on a response to the user input, identifying excess bandwidth (Z) where the excess bandwidth (Z) is equal to the average interface utilization (Y) minus the first threshold ($X_1$), identifying all flows passing through the interface during a congestion check interval ($T_C$), and identifying the destination node prefixes.

The method may further include, based at least in part on a first one of the destination node prefixes passing the DUAL-based LPA analysis for the plurality of alternate links and the plurality of next hops associated with the plurality of alternate links, recording at least one of the first filtered flows corresponding to the first one of the destination node prefixes as a candidate for flow mitigation. The method may further include calculating flow bandwidths for the recorded first filtered flows in a congestion check interval ($T_C$) time window and arranging the recorded first filtered flows in ascending order of the flow bandwidths. The method may further include presenting the mitigation plan to a user. The method may further include, based at least in part on a response from the user regarding the mitigation plan pushing flow information to an access list of the node and enabling the mitigation plan based on the access list. The filtering of the first filtered flows based at least in part on the flow bandwidth to obtain the second filtered flows comprises filtering the first filtered flows that have bandwidth that is cumulatively equal to or rounded to a higher value of excess traffic (Z). It may be noted that, in cases of IP-based methods described herein, destination prefixes may be filtered, and, in case of MPLS-based methods, egress nodes prefixes may be filtered.

Additionally, the techniques described herein may be performed as a method and/or by a system having non-transitory computer-readable media storing computer-executable instructions that, when executed by one or more processors, performs the techniques described above.

EXAMPLE EMBODIMENTS

As mentioned above, this disclosure describes techniques for mitigating localized congestion for interior gateway protocol (IGP) networks by offloading of traffic from a primary IGP link(s) undergoing congestion and locally distributing the traffic to alternate link(s) on the node.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of a network 100 that utilizes a network controller 104 to orchestrate congestion mitigation, according to an example of the principles described herein. The network controller 104 may be communicatively coupled to an administrator computing device 102. The administrator computing device 102 may include any computing device via which an individual such as a user or administrator may oversee the functioning of the network controller 104, receive information from the network controller 104 regarding the detection of a congestion event, receive requests from the network controller 104 for instructions to address a congestion event, input to the network controller 104 a number of business logic policies or rules, receive from the network controller 104 a mitigation plan developed by the network controller 104, transmit to the network controller 104 instructions to enable the mitigation plan, other activities, and combinations thereof.

The network controller 104 may include a topology collector 106 to, when executed by the network controller 104, collect, store, and/or update IGP topology data 126 of the network 100 using, for example, a border gateway protocol (BGP) link state address family identifier (AFI) and/or sub-address family identifier (SAFI) defined to carry interior gateway protocol (IGP) link-state database through BGP and/or simple network management protocol (SNMP) application-layer protocol. The IGP topology data 126 may represent the link state database of the IGP with all nodes, links, link metric, destination node prefix information, other data, and combinations thereof.

The network controller 104 may further include an interface utilization collector 108. The interface utilization collector 108, when executed by the network controller 104, may collect and store data or records associated with at least one interface of all the node(s) 112-1, 112-2, 112-3, 112-4, and 112-N, where N is any integer greater than or equal to 1 (collectively referred to herein as node(s) 112 unless specifically addressed otherwise) within the network 100 and/or the IGP domain. The nodes 112 may include any number of interfaces that may be used to communicate with other nodes 112 within the network 100, and the interface utilization collector 108 may detect utilization on all of those interfaces. The detected data may be referred to as interface utilization data 118. The nodes 112 may be described herein as "interested" nodes that are included within and IGP domain and which include links that may be monitored for congestion. In one example, all links of a node 112 may be monitored by the interface utilization collector 108 for congestion. The interface utilization data 118 collected by the interface utilization collector 108 may include egress bytes along with an interface identification (ID) (e.g., interface ID data 120). The interface utilization data 118 collected by the interface utilization collector 108 may be used for detecting congestion events on the link(s). Further, the interface utilization data 118 collected by the interface utilization collector 108 may be stored in the time series database 116 anywhere within the network 100 including at a data storage device associated with or included within the network controller 104.

In one example, telemetry and/or SNMP management information base (MIB) may be used to collect the interface utilization data 118, and the processes may vary depending on the platform support. Further, in one example, the interface utilization collector 108 may be used to set a cadence or frequency of collection which may be used to determine accuracy or resolution of the interface utilization data 118 collected by the interface utilization collector 108. Further, data retention by the interface utilization collector 108 may be performed for multiple congestion check intervals after which the data can be purged. More details regarding the congestion check intervals ($T_C$) is provided herein.

The network controller 104 may further include a traffic flow collector 110. The traffic flow collector 110, when executed by the network controller 104, may collect and store traffic flow data 122 or records passing through all the "interested" node(s) 112 including all links of those nodes that are to be monitored for congestion and that are part of the IGP domain. The traffic flow data 122 collected by the traffic flow collector 110 may include any data associated with traffic flowing from, for example, egress data, of at least one of the nodes 112. In one example, the traffic flow data 122 collected by the traffic flow collector 110 may be stored in within the time series database 116 described above, and anywhere within the network 100 including at a data storage device associated with or included within the network controller 104. This traffic flow data 122 may include transport layer (layer 4 (L4)), network layer (layer 3 (L3)) headers from internet protocol (IP) packets, and encapsulation headers such as, for example, multiprotocol label switching (MPLS), virtual extensible local area network (VXLAN), etc., along with an egress interface ID (e.g., egress interface ID data 124). In one example, the interface utilization collector 108 may detect an 80% utilization at a particular interface, but that a threshold utilization is set at 60% (e.g., that particular interface is being overutilized), the traffic flow collector 110 may be used to identify flows within the network that make up the excess 20% of the bandwidth utilization.

The processes associated with the collection of traffic flow may depending on platform capabilities. Possible methods of flow collection by the interface utilization collector 108 may include, for example, via use of the NetFlow bandwidth monitoring tool developed and distributed by Cisco Systems, Inc., via flow telemetry methods, other tools, methods, or software, and combinations thereof. Further, as similarly described above in connection with the interface utilization collector 108, the cadence or frequency of collection of the traffic flow data 122 by the traffic flow collector 110 may determine accuracy or resolution of the traffic flow data 122. Further, data retention by the interface utilization collector 108 may be performed for multiple congestion check intervals after which the data can be purged. In one example, the egress interface ID (e.g., egress interface ID data 124) from the traffic flow collector 110 and the interface ID (e.g., interface ID data 120) from the interface utilization collector 108 may have a 1:1 mapping within the time series database 116.

A congestion event 114 may have occurred among the nodes 112 within the network. This congestion event 114 may significantly reduce the ability of the nodes 112 to communicate, leading to degradation of service levels and user-experience. Thus, at "1," congestion event(s) such as the congestion event 114 between a first node 112-1 and an Nth node 112-N may be detected by the topology collector 106, the interface utilization collector 108, and/or the traffic flow collector 110 of the network controller 104.

At "2" as depicted in FIG. 1, the interface utilization collector 108, and/or the traffic flow collector 110 of the network controller 104 may engage in flow and interface qualification including collecting and storing the interface utilization data 118, interface ID data 120, traffic flow data 122, and egress interface ID data 124. At "3" of FIG. 1, a network operator (e.g., an administrator or other user) may be presented with workflow and change information including one or more steps associated with a mitigation plan to address the detected congestion at "1" and one or more opportunities to approve of actions taken by the network controller 104. In one example, obtaining administrative approvals or instructions may be optional, and the present systems and methods may function automatically without administrator supervision, or may function semi-automatically with at least some level of administrator supervision. In one example, the present systems and methods may function semiautomatically to allow for the administrator to provide input so that the administrator may provide input and/or approval.

At "4" of FIG. 1, the network controller 104 may deploy the mitigation plan developed by the methods and systems described herein and/or my retore or revert the mitigation plan back to a pre-mitigation state following a resolution of the congestion event 114. In this manner, the network controller 104 may ensure that the network 100 is functioning at an optimal state at all times whether in a mitigation state or within a non-mitigation state.

Figure 2:
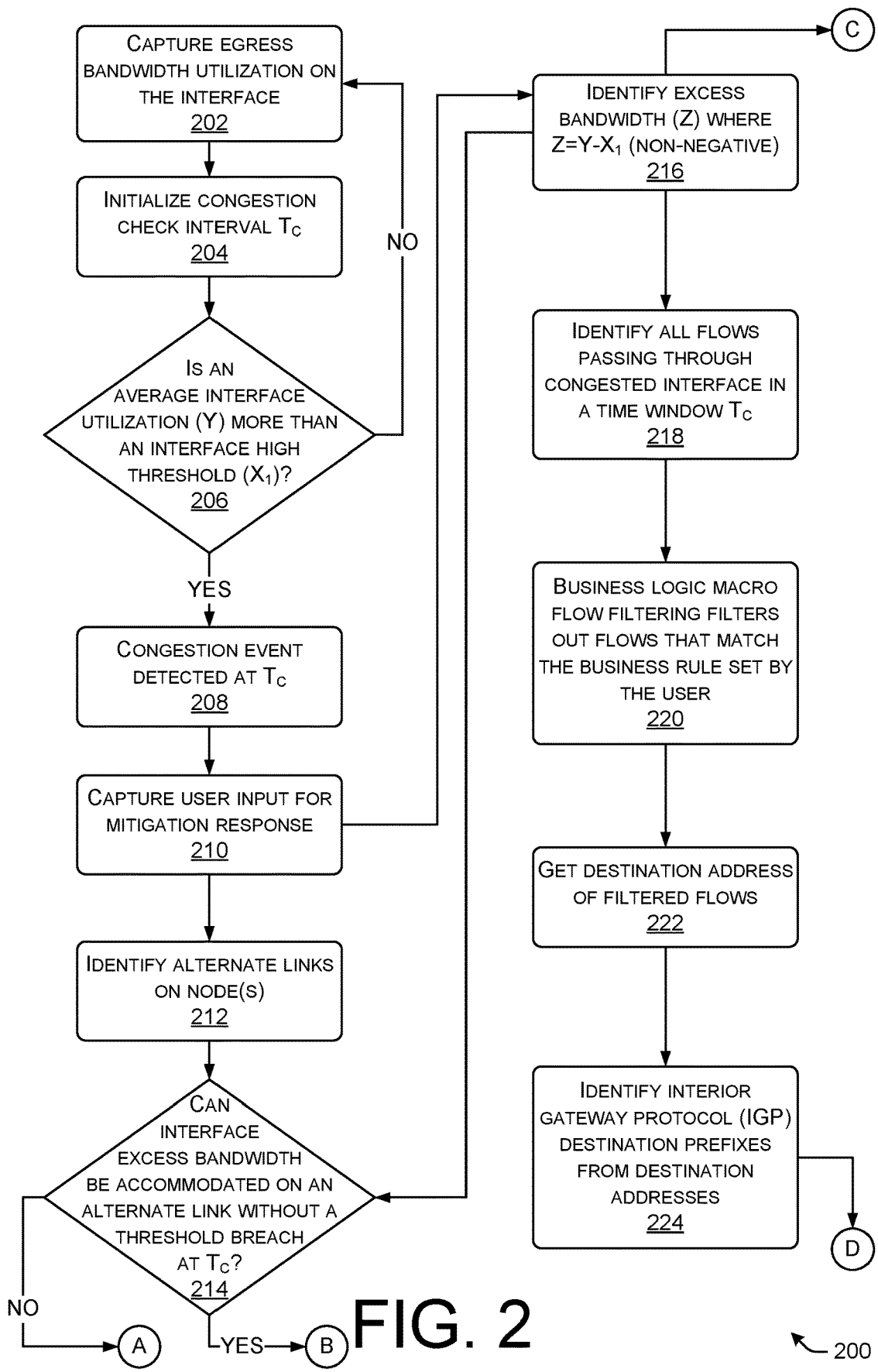
FIGS. 2 through 4 illustrate a flow diagram of an example method for congestion mitigation for an internet protocol (IP)-based network, according to an example of the principles described herein.
Figure 3:
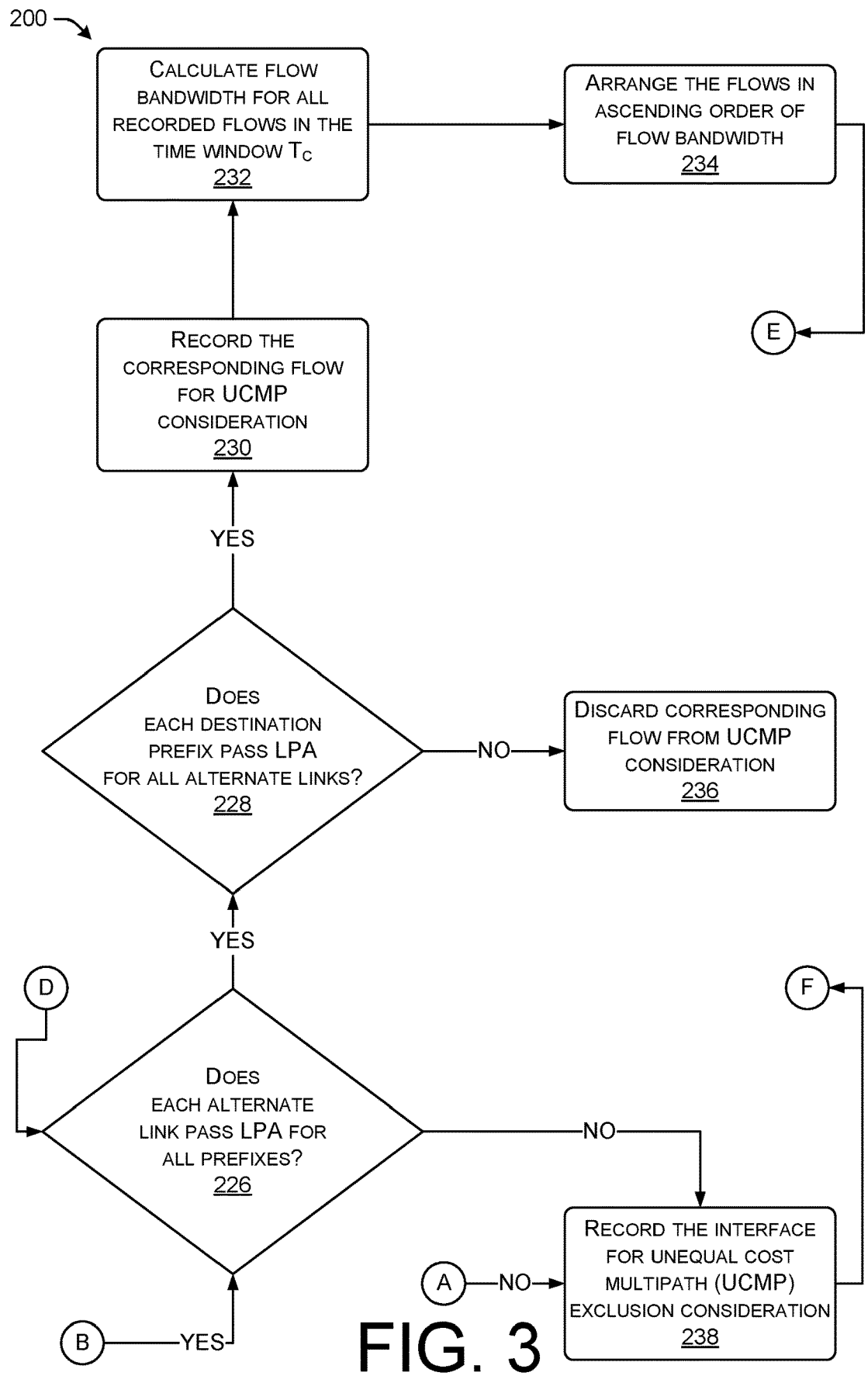
Figure 4:
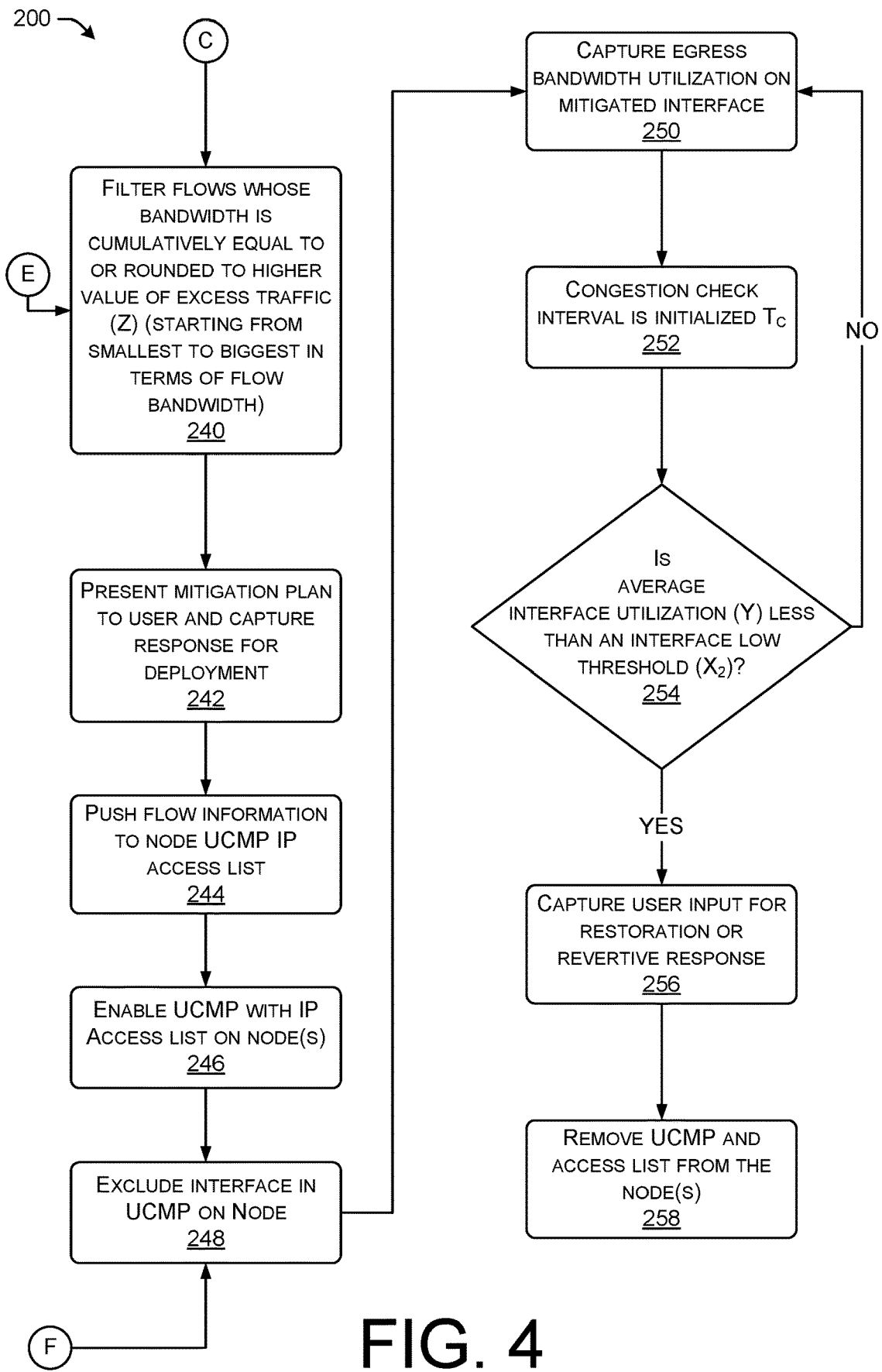

With the above description of the overall processes the network controller 104 may perform, details regarding those processes will now be described. The network 100 may include an internet protocol (IP)-based network or a multiprotocol label switching (MPLS)-based network, and the methods and systems described herein may function with either an IP-based network or an MPLS-based network as described herein in more detail in connection with FIGS. 2 through 4 and FIGS. 5 through 7, respectively. Specifically, FIGS. 2 through 4 illustrate a flow diagram of an example method 200 for congestion mitigation for an IP-based network, according to an example of the principles described herein.

FIGS. 2-7 illustrate flow diagrams of example methods 200 and 500 and that illustrate aspects of the functions performed at least partly by the network controller 104, the topology collector 106, the interface utilization collector 108, the traffic flow collector 110, the nodes 112, the time series database 116, the network 100 as a whole, other devices described herein, and combinations thereof. The logical operations described herein with respect to FIGS. 2-7 may be implemented (1) as a sequence of computer-implemented acts or program modules running on a computing system and/or (2) as interconnected machine logic circuits or circuit modules within the computing system. In some examples, the methods 200 and 500 may be performed by a system comprising one or more processors and one or more non-transitory computer-readable media storing computer-executable instructions that, when executed by the one or more processors, cause the one or more processors to perform the methods 200 and 500.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 2-7 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The method 200 may include, at 202, the network controller 104 executing the interface utilization collector 108 to capture egress bandwidth utilization data on the interface of, for example, first node 112-1 where the congestion event 114 is detected. The egress bandwidth utilization metrics captured at 202 on the interface of the first node 112-1 may include any metric used to measure a rate of data transfer across a given path egressing from a node 112 such as, for example, the first node 112-1.

The topology collector 106 may also be executed by the network controller 104 in order to collect, store, and/or update IGP topology data 126 of the network 100 and determine the topology of the network 100 and the nodes 112 therein. This may allow for the identification of the location of the congestion event 114 among the nodes 112.

At 204 of FIG. 2, the network controller 104 may initialize a congestion check interval ($T_C$) during which the detecting of the congestion event and/or any network metrics may be performed. In one example, the congestion check interval ($T_C$) may be initialized by the network controller 104 executing one or more of the topology collector 106, the interface utilization collector 108, and the traffic flow collector 110. In one example, the interface utilization collector 108 may capture statistics defining southbound protocols (e.g., telemetry-based statistics, telemetry-based statistics, etc.).

In one example, the congestion check interval ($T_C$) may include any time window that can be used to aggregate sampled utilization data. In one example, the congestion check interval ($T_C$) may include a cadence or frequency at which congestion within the network 100 is checked for any congestion events. In one example, the frequency and/or duration of the congestion check interval ($T_C$) may be defined by an individual such as the administrator and may depend on one or more policies. For example, certain industries such as banking or investment industries may require more frequent and/or longer duration congestion check intervals ($T_C$) with respect to, for example, organizations within the manufacturing industry.

At 206, the network controller 104 may execute the interface utilization collector 108 to determine, during the congestion check interval ($T_C$), whether an average interface utilization (designated as "Y") such as an egress bandwidth utilization is greater than an interface high threshold (designated as "$X_1$"). In response to or based at least in part on a determination that the average interface utilization (Y) is not greater than the interface high threshold ($X_1$)(206, determination NO), then the method 200 may loop back to 202 to allow for the process to occur again during a subsequent congestion check interval ($T_C$).

The congestion check interval ($T_C$) may depend on a number of factors such as, for example, a number of samples required to compute the average interface utilization Y, the ample collection cadence or frequency, an expected threshold breach sensitivity (e.g., considering a single sample threshold breach as a congestion event or considering threshold breach of an average of multiple samples over time), other factors, and combinations thereof. In one example, these and other factors may be user-defined.

In response to or based at least in part on a determination that the average interface utilization (Y) is greater than the interface high threshold ($X_1$), then the network controller 104 may determine that a congestion event has occurred during the time window defined by the congestion check interval ($T_C$). For example, the congestion event 114 may be detected at one of the egress interfaces of the first node 112-1 between the first node 112-1 and the Nth node 112-N. In one example, if and when a congestion event 114 is detected, a user such as an administrator may be made aware of the congestion event 114 through, for example, a message transmitted to the administrator computing device 102. In one example, the interface high threshold ($X_1$) may be user-defined by, for example, the administrator. Further, the interface high threshold ($X_1$) may be defined for each of a plurality of interfaces for each of the nodes 112 within the network 100. The average interface utilization (Y) may be obtained by taking an average of all samples of interface utilization captured during the congestion check interval ($T_C$) for each of a plurality of interfaces of the nodes 112 such as the first node 112-1 in the present example.

In response to or based at least in part on a determination that the average interface utilization (Y) is greater than the interface high threshold ($X_1$) (206, determination YES), at 208, a congestion event is detected at the congestion check interval ($T_C$). At 210, the administrator may be presented with the message indicating that the congestion event 114 has occurred at the administrator computing device 102, the administrator may send, via the administrator computing device 102 a response to the message. Thus, at 210, the user (e.g., administrator) input may be captured regarding whether the network controller 104 may move forward with a mitigation response. At 210, the process may include two separate paths leading to 212 and 216.

As a first of the two branches, at 212, the method 200 may include identifying alternate links on the nodes 112. In one example, the network controller 104 may execute the topology collector 106 to identify the alternate links on the nodes 112, and in the example of FIG. 1, the alternate links associated with the first node 112-1 may be identified. In one example, the alternate links may be identified at 212 based on a topology table created by the topology collector 106 and stored as at least part of the IGP topology data 126. The topology collector 106 may identify in the topology table what IGP interfaces exist on the node 112 apart from the congested interface identified at 208. Further, the network controller 104 may execute the traffic flow collector 110 to identify the traffic flows that are traveling through and/or attempting to travel through the congested interface (e.g., the interface of the first node 112-1 of FIG. 1 that triggered the congestion event 114). The traffic flows may be identified by a 3-tuple, 4-tuple, or 5-tuple of the source address, source port, destination address, and destination port information (or, equivalently, a pair of network sockets for the source and destination, each of which is made up of an address and a port).

As a second of the two branches, at 216, the method 200 may include, with the network controller 104, identifying excess bandwidth (designated as "Z") or traffic that may be offloaded from the node 112 associated with the congestion event 114 (e.g., the first node 112-1). Based on the average interface utilization (Y) and the interface high threshold ($X_1$) calculated at 206, the excess bandwidth may be calculated using the following Equation 1:

$$Z = Y - X_1 \quad \text{Eq. 1}$$

where $X_1$ is a non-negative number.

The value obtained at 216 defining the excess bandwidth (Z) that is to be offloaded from the node 112 associated with the congestion event 114 may be input to 214 where the network controller 104 may determine if the excess bandwidth (Z) at the interface of the node 112 associated with the congestion event 114 may be accommodated on any other alternate link identified at 212 without breaching the interface high threshold ($X_1$) for the congestion check interval ($T_C$). In response to or based at least in part on a determination that the excess bandwidth (Z) may not be accommodated on any other alternate link without breaching the interface high threshold ($X_1$) for the congestion check interval ($T_C$) (214, determination NO), the interfaces of at least those alternate links that cannot not accommodate such excess bandwidth (Z) may, at 238 of FIG. 3 (following flow marker "A"), be recorded as interfaces that are to be considered for exclusion from a congestion mitigation plan (e.g., excluded form UCMP load balancing) as viable options. Further, following flow marker F, at 248 of FIG. 4, the interfaces recorded at 238 may be subsequently excluded from the congestion mitigation plan (e.g., excluded form UCMP load balancing) on the node 112 and/or the network controller 104.

For example, in a situation where a node 112 where a congestion event is detected includes three interfaces. In this example, a first interface of this node 112 may have an 80% utilization when the interface threshold of the first interface may be 60%. This means that the first interface is congested by 20% and this 20% should be offloaded. Thus, the bandwidth threshold of the second interface and the third interface may be checked to see if either of these interfaces may take the 20% load off of the first interface. If the second interface has an interface threshold of 80% and is handling 80% of load, then the second interface of the node 112 is not a viable candidate for offloading the 20% from the first threshold since doing so would bring the second interface above its interface threshold. However, if the third interface has an interface threshold of 70% and is actively handling 40% of a load, then the system may offload the 20% from the first interface to the third interface since the third interface is able to handle 30% more of the load. Thus, at 214, such an analysis is performed for each interface for each node 112 and each alternate link within the network 100 in order to alleviate the congestion detected at 208.

The above example may be described with a caveat: that individual flows may not be divided or split between multiple interfaces and a single flow must be transmitted via a single interface even if that flow requires a large percentage of bandwidth. Thus, in the examples described herein, it may be possible that the excess bandwidth (Z) is a single flow, and an evaluation may occur where the network controller 104 may determine if there exists an alternate link that can handle the entirety of the traffic flow. Further, in one example, the excess bandwidth (Z) may include multiple flows allowing for at least one of the flows to be separated from the group of flows making up the excess demand (Z) and redirected via the alternate link or interface. Given the above, the determination at 214 may allow for at least one flow to be separated from the excess bandwidth (Z) and redirected via another interface in situations where the excess bandwidth (Z) is represented by that single flow, and that single flow may be directed via a single interface of one of the alternate links identified at 212.

Turning again to 216 of FIG. 2 and having identified all the alternate links on the node(s) 112 at 212, the network controller 104, executing the interface utilization collector 108 and/or the traffic flow collector 110, may also, at 218, identify all flows passing through the congested interface (e.g., the interface of the first node 112-1) during the congestion check interval ($T_C$). At 218, the network controller 104 may identify all flow data received during the time window defined by the congestion check interval ($T_C$) where the congestion event 114 has been detected.

At 220, the network controller 104 may apply business logic (BL) macro flow filtering to filter out flows among those flows included in the excess bandwidth (Z) that match a business rule set by a user such as the administrator. In one example, the administrator may define a number of the business rules at the administrator computing device 102 and provide those rules to the network controller 104. The network controller 104 may execute the business rules at 220 via the business logic macro flow filtering in order to filter out, for example, low-priority traffic as opposed to relatively higher-priority traffic. In one example, the low-priority traffic and the relatively higher-priority traffic may be defined by a quality-of-service (QoS) requirement and/or the service-level agreements (SLAs) and user-input. Examples of low-priority traffic may include, for example, internet protocol precedent (IPP) values defined for the traffic flows that have a value of 0 for the low-priority traffic or 1 for the relatively higher-priority traffic. In one example, the IPP values may be included as a value defined in a type of service (ToS) filed of a data packet header. For example, where a user or administrator desires that traffic flow associated with real-time calling or video conferencing is not subjected to the business logic macro flow filtering of 220, the business rules may be designed to reflect those desires and disqualify these types of traffic flows from filtering. In contrast, the business rules may be designed to filter out traffic flows associated with browsing, for example, to be subjected to conditional mitigation or redirected to other interfaces via the execution of the business rules. The business logic defining these IPP precedent values may be utilized by the network controller 104 when executing the BL macro flow filtering at 220. In one example, the administrator may define the business logic and business rules associated with the business logic macro flow filtering of 220, and, in one example, may be predefined by the administrator before execution of the business logic macro flow filtering.

At 222, the network controller 104 may obtain destination addresses of the filtered flows obtained from 220. In one example, the network controller 104 may parse destination addresses from the flow records obtained at 218. The destination addresses may be saved as part of the IGP topology data 126 and may be mapped to a respective traffic flow using data obtained by the topology collector 106. This mapping may be saved in a topology table by the topology collector 106 of the network controller 104.

The network controller 104, at 224, may identify IGP destination node prefixes from the destination address of the topology table of the IGP topology data 126. Because the filtered flows may be processed through a network computation that utilizes prefixes (e.g., routes) and IP addresses instead of traffic flows, the network controller 104 may prepare a list of all the destination addresses and prefixes for each of the filtered traffic flows. The filtered traffic flows may be associated with the destination IP addresses such as, for example, 192.168.1.1 and the topology collector 106 may have collected IGP topology data 126 for a route having the prefix such as, for example, 192.168.1.0/24 which encompasses values from 192.168.1.1 to 192.168.1.252. The network controller 104 may consider the destination addresses for each of the traffic flows as mapped out in the topology table to determine a most specific match of the prefixes for the filtered flows.

The method may further include a second filtering process at 226 and 228. The method 200 proceeds to 226 of FIG. 3 in response to or based at least in part on a determination that the excess bandwidth (Z) may be accommodated on any other alternate link without breaching the interface high threshold ($X_1$) for the congestion check interval ($T_C$) (214, determination YES) (following flow marker "B") and/or following the identify IGP destination node prefixes at 224 (following flow marker "D"). At 226, the method 200 may further include determining if each alternate link identified at 212 passes a loop-free path-finding algorithm (LPA) analysis for all prefixes. Thus, at 226, it may be determined if each alternate link passes the LPA analysis. The alternate links described herein may conform to at least a loop-freeness condition that guarantees that forwarding traffic to a loop-free alternate (LFA) does not result in a loop after link failure.

In one example, the network controller 104 may perform the LPA analysis at 226 using a diffusing update algorithm (DUAL)-based LPA. DUAL LPA utilized in enhanced interior gateway routing protocol (EIGRP) developed and distributed by Cisco Systems, Inc. may be based on diffusing computations for internodal synchronization and utilizes distances to destinations to operate. DUAL synchronizes routers that modify their distance information in a way that no long-term or temporary loops are created in routing tables.

In response to or based at least in part on a determination that an alternate link does not pass the LPA analysis (226, determination NO), that alternate link and/or any other alternate link that does not pass at 226 may be recorded as interfaces that are to be considered for exclusion from the congestion mitigation plan (e.g., excluded form UCMP load balancing) as viable options at 238. Further, following flow marker F, at 248 of FIG. 4, the interfaces recorded at 238 may be subsequently excluded from the congestion mitigation plan (e.g., excluded form UCMP load balancing) on the node 112 and/or the network controller 104.

In response to or based at least in part on a determination that an alternate link does pass the LPA analysis (226, determination YES), the alternate links that do pass 226 may be analyzed to determine if each destination node prefix associated with the IP addresses of the destination node and the alternate links pass the LPA at 228. As similarly described above, the network controller 104 may perform the LPA analysis at 228 using a diffusing update algorithm (DUAL)-based LPA.

Figure 8:
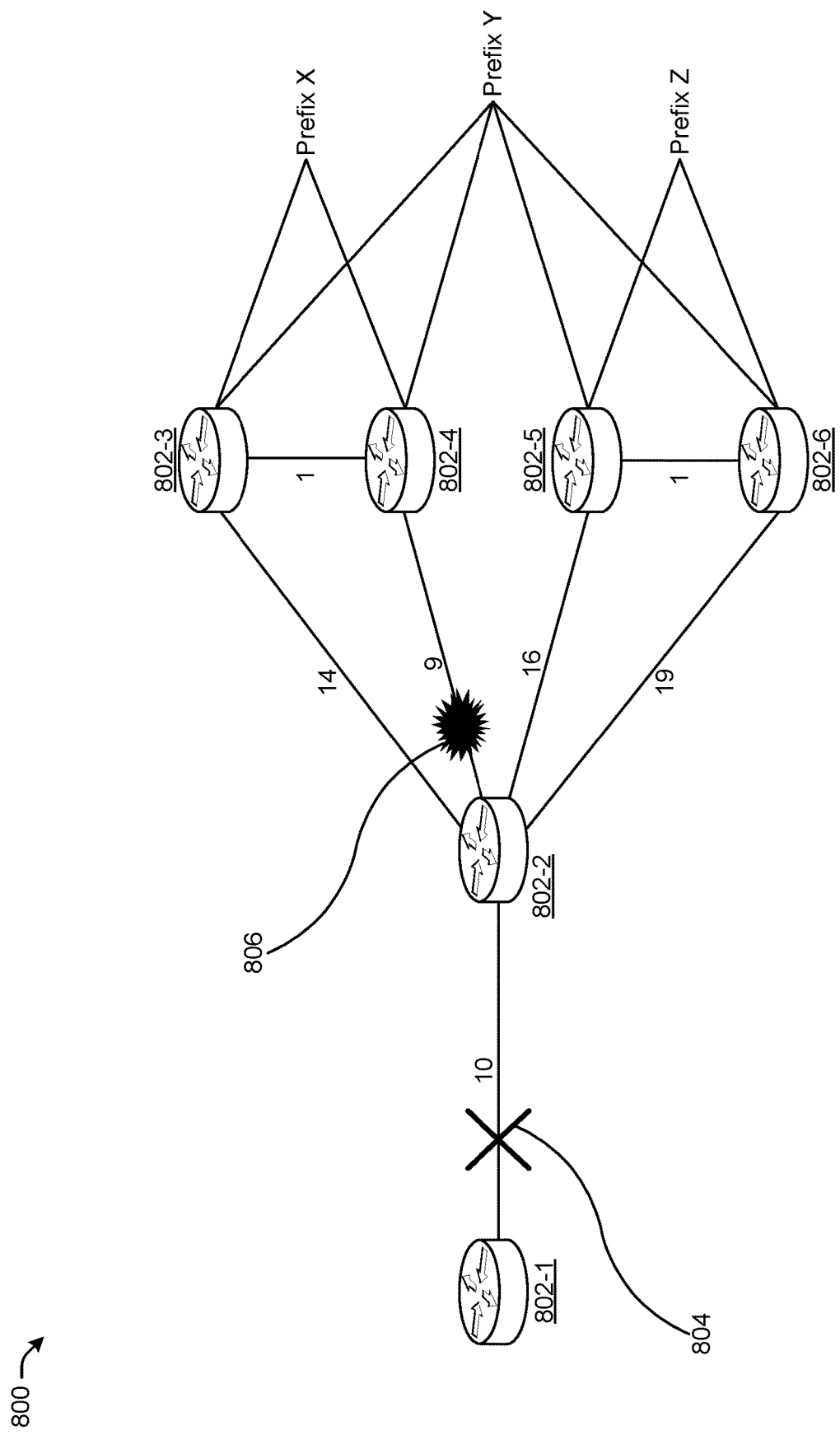
FIG. 8 illustrates a diagram of a network including a number of nodes depicting determination of feasibility of a number of interfaces to ensure a loop-free alternate path for a number of prefixes, according to an example of the principles described herein.
Figure 9:
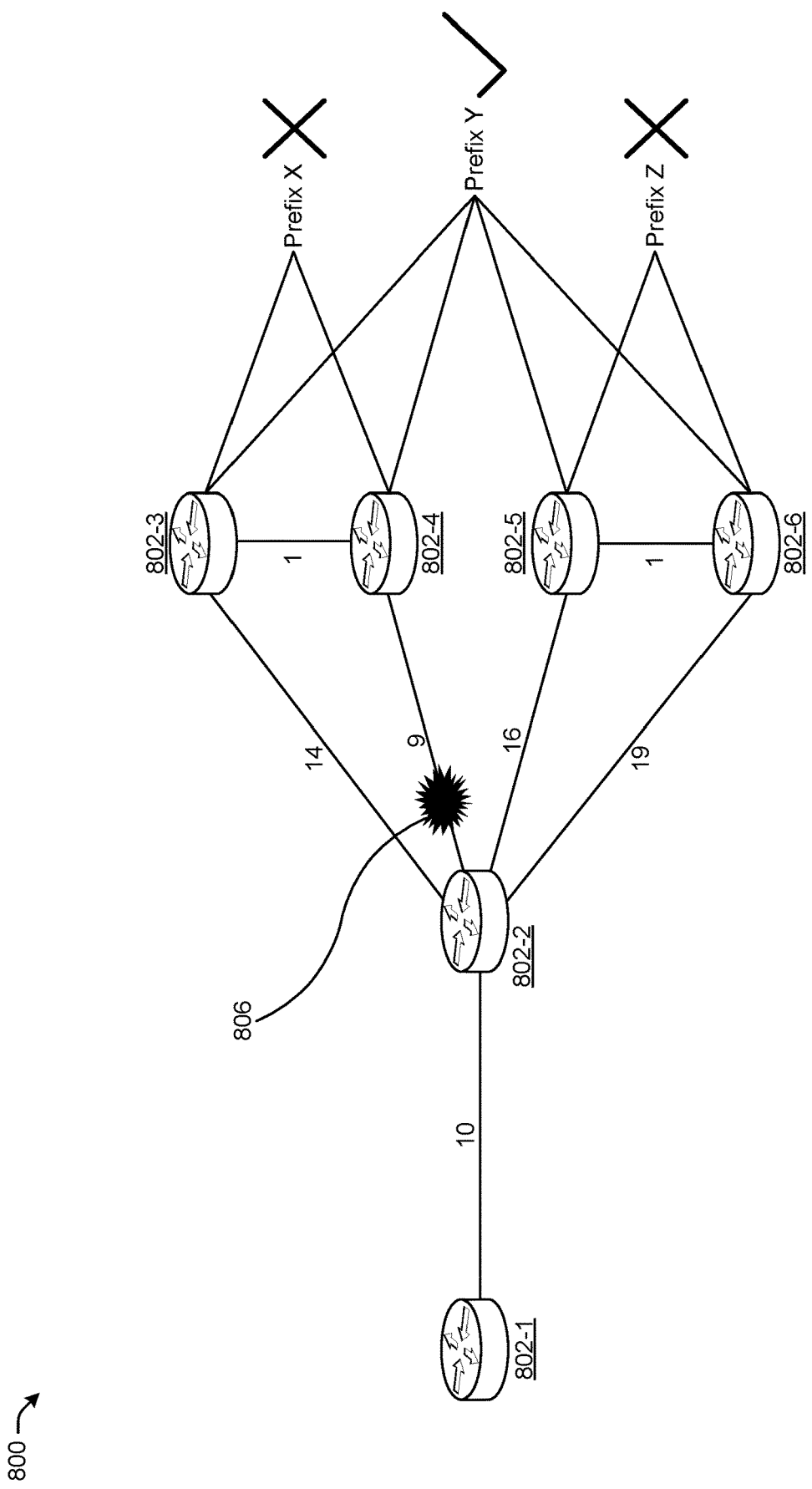
FIG. 9 illustrates a diagram of a network including a number of nodes depicting validation of destination node prefixes against diffusing update algorithm (DUAL)-based loop-free path-finding algorithm (LPA) analysis for all identified interfaces, according to an example of the principles described herein.

As an example of how the network controller 104 may perform the computations based on LPA to check the feasibility of the interfaces and to ensure a loop-free alternate path for all prefixes, FIG. 8 illustrates a diagram of a network 800 including a number of node(s) 802-1, 802-2, 802-3, 802-4, and 802-N, where N is any integer greater than or equal to 1 (collectively referred to herein as node(s) 802 unless specifically addressed otherwise) depicting determination of feasibility of a number of interfaces to ensure a loop-free alternate path for a number of prefixes, according to an example of the principles described herein. FIG. 9 illustrates a diagram of a network including a number of nodes 802 depicting validation of destination node prefixes against the DUAL-based LPA analysis for all identified interfaces, according to an example of the principles described herein. In the example of FIGS. 8 and 9, a congestion event 806 may have occurred and/or may have been detected between a second node 802-2 and a fourth node 802-4. Due to the requirement that the alternate links used to mitigate the congestion event 806 are to be loop-free alternate paths, the alternate link between the second node 802-2 and the first node 802-1 may be excluded from consideration as such an alternate link since redirection of the traffic flow to the first node 802-1 would merely cause the traffic flow to be looped back to the second node 802-2 continually. Thus, as indicated by 804, the link between the second node 802-2 and the first node 802-1 is excluded.

Further, as depicted in FIGS. 8 and 9, the costs for the various alternate links are shown. For example, the cost of the alternate link between the second node 802-2 and the first node 802-1 is 10; the cost of the alternate link between the second node 802-2 and the third node 802-3 is 14; the cost of the alternate link between the second node 802-2 and the fourth node 802-4 is 9; the cost of the alternate link between the second node 802-2 and the fifth node 802-5 is 16; and the cost of the alternate link between the second node 802-2 and the sixth node 802-6 is 19. Further, the cost of the alternate link between the third node 802-3 and the fourth node 802-4 is 1; and, similarly, the cost of the alternate link between the fifth node 802-5 and the sixth node 802-6 is also 1. Thus, another way to state that the alternate link between the second node 802-2 and the first node 802-1 for destination node prefixes "X," "Y," and "Z," may be excluded since the next hop from the second node 802-2 to a first node 802-1 does not meet the DUAL/LPA condition of PFX_IGP_Cost (802-1, Destination node prefix)<PFX_IGP_Cost (802-1, 802-2)+PFX_IGP_Cost (802-2, Destination node prefix).

Further, extending this example to other alternate paths, PFX_IGP_Cost (802-2, Destination node prefix) is the shortest path distance from the second node 802-2 to the destination node prefixes (X,Y,Z). PFX_IGP_Cost (802-1, Destination node prefix) is the shortest path distance from the neighbor node (e.g., the first node 802-1) to the destination node prefixes (X,Y,Z). PFX_IGP_Cost (802-1, 802-2) is the shortest path distance from the neighbor node (e.g., the first node 802-1) to the second node 802-2 for which congestion mitigation is being analyzed. Thus, the alternate link between the second node 802-2 and the first node 802-1 is excluded from consideration within a congestion mitigation plan. Thus, at 228, if an alternate link does not qualify for any or all the destination node prefixes (e.g., destination node prefixes (X,Y,Z)) (228, determination NO, then those unqualifying alternate links may be recorded as interfaces that are to be considered for exclusion from the congestion mitigation plan (e.g., excluded form UCMP load balancing) as viable options at 236. Further, following flow marker F, at 248 of FIG. 4, the interfaces recorded at 238 may be subsequently excluded from the congestion mitigation plan (e.g., excluded form UCMP load balancing) on the node 112 and/or the network controller 104. It may be noted that although the alternate link between the second node 802-2 and the first node 802-1 was identified as being able to accommodate the excess bandwidth (Z) without breaching an interface high threshold ($X_1$) at 214, it may still be excluded due to the LPA analysis performed at 226.

In response to or based at least in part on a determination that an alternate link does not pass the LPA analysis for any or all of the destination node prefixes (228, determination NO), then the corresponding traffic flow associated with that alternate link and destination node prefix along with any corresponding traffic flows may be discarded from the mitigation plan (e.g., excluded form UCMP load balancing) on the node 112 and/or the network controller 104 as indicated by 238 and 248. In response to or based at least in part on a determination that an alternate link does pass the LPA analysis for any or all of the destination node prefixes (228, determination YES), then the method may proceed to 228. The process at 226 may be referred to as interface-level filtering.

At 228, a determination may be made as whether each destination node prefix (e.g., destination node prefixes (X,Y, Z)) passes LPA analysis for all the alternate links. In one example, the process of 228 may be performed for all alternate links or next hops within the network. Thus, in contrast to the interface-level filtering of 226, 228 may be referred to as flow-level filtering. At 228, the network controller 104 may perform this computation based on the DUAL/LPA algorithms to check the feasibility of the prefixes in order to ensure a loop-free alternate path on all interfaces identified from 226. With reference again to FIGS. 8 and 9, it may be noted that the fifth node 802-5 and the sixth node 802-6 acting as next hops (per DUAL/LPA) cannot provide a loop-free alternate path for prefix Z. Further, the third node 802-3 and the fourth node 802-4 acting as next hops (per DUAL/LPA) cannot provide a loop-free alternate path for prefix X. However, all of the third node 802-3, the fourth node 802-4, the fifth node 802-5, and the sixth node 802-6 acting as next hops (per DUAL/LPA) can provide a loop-free alternate path for prefix Y. As to prefix X, the fifth node 802-5 and the sixth node 802-6 may fail as candidates since a path to prefix X through either of the fifth node 802-5 or the sixth node 802-6 would not be loop free. Similarly, as to prefix Z and with the further node 802-4 including the congested path, the third node 802-3 may fail as a candidate since a path to prefix Z through the third node 802-3 would not be loop free as well. Thus, the flows corresponding to prefix X and prefix Z may be excluded from consideration (228, determination NO). Further, because prefix Y is reachable by all of the third node 802-3, the fourth node 802-4 (via the third node 802-3), the fifth node 802-5, and the sixth node 802-6, prefix Y passes the determination at 228 (228, determination YES) (e.g., the traffic flows corresponding to prefix Y are not excluded).

At 228, for a given destination node prefix that has been excluded from consideration (e.g., destination node prefixes X and Z), the corresponding traffic flow will continue to flow via the pre-mitigation IGP path (e.g., the path between the second node 802-2 and the fourth node 802-4 that is congested). Conversely, for a given destination node prefix that has not been excluded from consideration (e.g., destination node prefix Y), the corresponding traffic flow may be considered for the mitigation plan (e.g., UCMP consideration). It may also be noted that if none of the destination node prefixes may be considered as candidates for the mitigation plan (e.g., UCMP consideration), then the congestion event 806 simply remains, no mitigation plan is implemented, and the traffic flows continues to flow between the second node 802-2 and the fourth node 802-4.

For those traffic flows and corresponding destination node prefixes that qualify at 226 228, the network controller 104, at 230, may record the corresponding traffic flows as being considered for the mitigation plan (e.g., UCMP consideration). For each of the traffic flows considered at 230, each may include at least one destination node prefix which may include a plurality of destination IP addresses. For example, a first destination node prefix may include 192.168.1.0/34 may identify all the traffic flows with destination IP addresses between 192.168.1.1 and 192.168.1.34 (e.g., all the destination IP address that are part of the route associated with the first destination node prefix.

The network controller 104 may, at 232, calculate all the flow bandwidths for all the flows recorded at 230 for the congestion check interval ($T_C$). The network controller 104 may analyze flow data received during the congestion check interval ($T_C$) where the congestion event 114 has been detected. Flow data may include an egress interface identifier (ID) along with a timestamp of a first switched packet (% FIRST_SWITCHED), timestamp of last switched packet (% LAST_SWITCHED), and a value defining the total sent bytes (% OUT_BYTES). In one example, this data may be obtained by the network controller 104 executing the traffic flow collector 110. Using this data, the bandwidth of each traffic flow may be calculated using Equation 2 as follows:

$$OUT\_BPS=OUT\_BYTES*8/(LAST\_SWITCHED)-(FIRST\_SWITCHED) \quad \text{Eq. 2}$$

Stated another way, the egress bandwidth per second (e.g., OUT_BPS) may be calculated by multiplying the total sent bytes (e.g., OUT_BYTES) by 8 to obtain the number of bits and dividing that value by the time value of the difference between the last switched packet (e.g., LAST_SWITCHED) and the first switched packet (e.g., FIRST_SWITCHED).

At 234, the traffic flows may be arranged in ascending order of flow bandwidths as determined at 232. In one example, the ascending order may be any order where the traffic flows are arranged in either lowest-to-highest or highest-to-lowest order. The traffic flows may be ordered according to their calculated bandwidths. At 240 and of FIG. 4 (following flow markers "E" from 234 and "C" from 216), the network controller 104 may perform bandwidth-based flow filtering by filtering traffic flows whose bandwidth is cumulatively equal to or rounded to a higher value of the excess bandwidth (Z) as identified at 216 starting from smallest to biggest in terms of flow bandwidth. As mentioned above, because individual traffic flows may not be divided, an objective may be to collect as many smaller-bandwidth flows whose cumulative bandwidths add up to the excess bandwidth (Z). In this manner, a relatively larger number of traffic flows may be redirected rather than selecting relatively larger-bandwidth traffic flows where relatively fewer traffic flows may be redirected. Generally, the more traffic flows that may be redirected across alternate links, a more effective mitigation plan may be achieved by allowing for a more even distribution of traffic flows throughout the network 100.

A mitigation plan including the redirection of the traffic flows identified through the bandwidth-based flow filtering of 240 may be presented to a user such as the administrator at 242. In one example, the mitigation plan may be presented to the administrator via the administrator computing device 102. In one example, the mitigation plan may be presented to the administrator via a dashboard, an application program interface (API), a webhook, an email, a messaging bus interface such as, for example, Apache Kafka or advanced message queuing protocol (AMQP), other communications methods and systems, and combinations thereof. Further, at 242, the network controller 104 may receive or capture a response from the administrator regarding the deployment of the mitigation plan. In one example, the administrator or other user may preview the recommendations and either call for a commit action or an abort action.

In one example, control may be given to the administrator to approve the mitigation plan and/or post which mitigation plan deployment will be initialized. With regard to the flow data, in some scenarios, the traffic flows identified during the congestion check interval ($T_C$) may be terminated at the time of deployment of the mitigation plan due to various reasons such as, for example, a connection reset within the network 100. Further, the traffic flow volume may change from the time of congestion detection to the time of deployment of the mitigation plan. However, the effectiveness of the present systems and methods may not be impacted since the present systems and methods addresses congestion mitigation at a volumetric level and is not targeted to specific traffic flows.

Assuming the administrator has instructed the network controller 104 to move forward with the mitigation plan, at 244, the flow information defining the redirection of the traffic flows identified through the bandwidth-based flow filtering of 240 may be pushed to the IP access lists (e.g., UCMP IP access lists) of the nodes including the congested node (e.g., the first node 112-1 of FIG. 1 and the second node 802-2 of FIGS. 8 and 9). In one example, nodes 112 may have the capability to conditionally apply the mitigation plan (e.g., UCMP) based at least in part on the flow information that includes L4 and L3 headers. Thus, in the case of a commit action being received from the administrator, the network controller 104 may instantiate rendering of configuration on the node (e.g., a UCMP router) using a standards-based southbound protocol that may facilitate communication between the network controller 104 and the infrastructure including the nodes 112. The network controller 104 may use this protocol to push the configuration to match excess flows, install additional links in a routing information base (RIB) and/or a forwarding information base (FIB) for the destinations associated with the excess flows. Further, the network controller 104 may configure the configurations using UCMP. The methods by which communication between the network controller 104 and the infrastructure may be facilitated may vary depending on the capabilities of the network controller 104 and the platform. Other methods of communication between the network controller 104 and the infrastructure may include using command line interface (CLI) protocols, RESTCONF protocols, and/or NETCONF protocols, among others.

At 246, the mitigation plan (e.g., the UCMP) may be enabled using the IP access lists stored at the nodes 112. At 248, any other interfaces that were not identified as candidates including any interfaces rejected by the administrator at 242 may be excluded from the congestion mitigation plan (e.g., excluded form UCMP load balancing) on the node 112 and/or the network controller 104. At 248, two types of interfaces may be excluded. A first type of interface that may be excluded may include interfaces that cannot accommodate the excess bandwidth (Z) without exceeding the threshold as described in connection with 214. A second type of interface that may be excluded may include interfaces that does not qualify following the interface LPA analysis of 226 and/or the destination node prefix LPA analysis of 228.

With the mitigation plan enabled, there may come a point where congestion at the congested node (e.g., the first node 112-1 of FIG. 1 and the second node 802-2 of FIGS. 8 and 9) exists. Therefore, the present systems and methods provide for reversion of the mitigated state back to a pre-mitigated state or a second mitigated state. At 250, the network controller 104 executing the interface utilization collector 108 may again capture egress bandwidth utilization data on the interface of, for example, the first node 112-1 where the congestion event 114 was originally detected and in a manner similar to 202. At 252 of FIG. 4, the network controller 104 may initialize another congestion check interval ($T_C$) during which the detecting of the congestion event and/or any network metrics may be performed.

At 254, and in a manner similar to 206 of FIG. 2, the network controller 104 may execute the interface utilization collector 108 to determine, during the congestion check interval ($T_C$), whether the average interface utilization (Y) such as an egress bandwidth utilization is greater than an interface low threshold (designated as "$X_2$"). In response to or based at least in part on a determination that the average interface utilization (Y) is not lower than the interface low threshold ($X_2$)(254, determination NO), then the method 200 may loop back to 250 to allow for the process to occur again during a subsequent congestion check interval ($T_C$).

In response to or based at least in part on a determination that the average interface utilization (Y) is lesser than the interface low threshold ($X_2$) (254, determination YES), at 256, the administrator may be made aware of the alleviation of the congestion event and the network controller 104 may receive input from the administrator to restore the network 100 to its pre-mitigation state or revert the state of the mitigation plan back to a pre-mitigation state. A pre-mitigation state may include the routes utilized by traffic flows before the mitigation plan was congestion event is detected at the congestion check interval ($T_C$). Thus, if the average interface utilization (Y) is greater than the interface high threshold ($X_1$), then a congestion event 114 is present within the network 100, and if the average interface utilization (Y) is lesser than the interface low threshold ($X_2$), then the congestion event 114 no longer exists and revertive or restorative action may be taken.

Assuming the administrator has instructed the network controller 104 to take restorative or revertive action, at 258 the network controller 104 may remove the mitigation plan (e.g., UCMP) and access lists from the node(s) 112. By doing so, the traffic flows will shift back to their respective pre-mitigation states. The method of FIGS. 2 through 4 may be performed any number of times and throughout any number of congestion check intervals ($T_C$).

Figure 5:
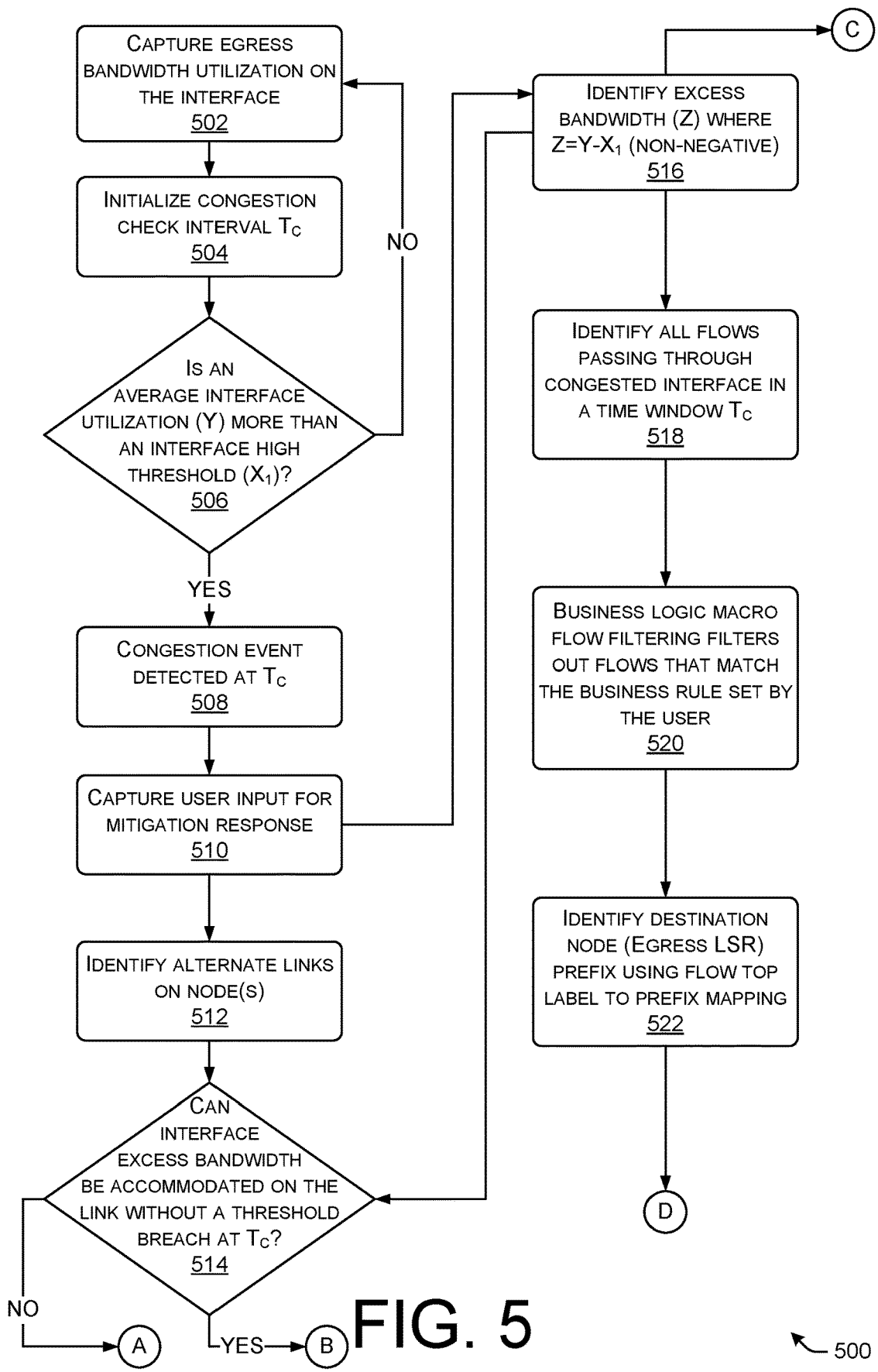
FIGS. 5 through 7 illustrate a flow diagram of an example method for congestion mitigation for a multiprotocol label switching (MPLS)-based network, according to an example of the principles described herein.
Figure 6:
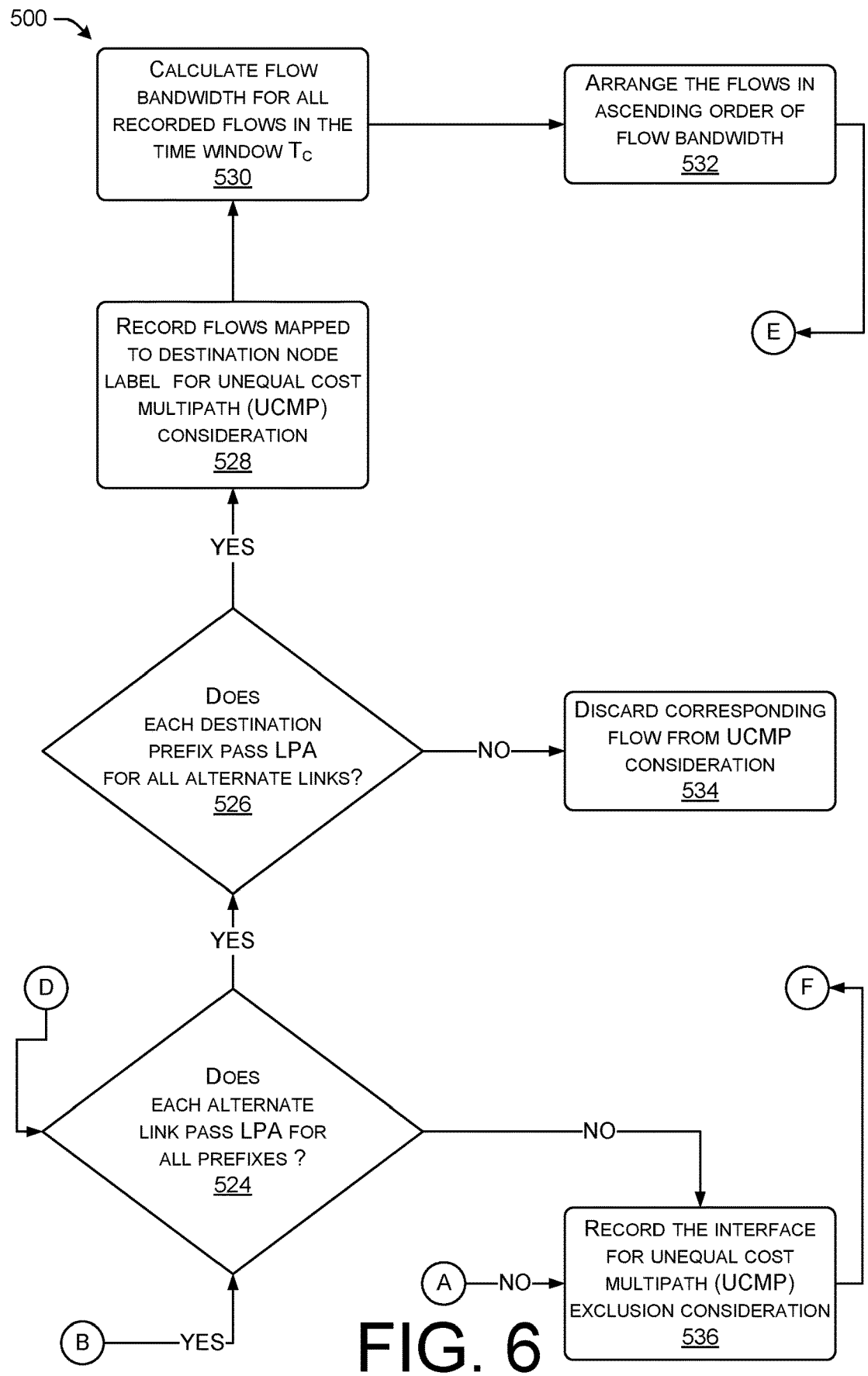
Figure 7:
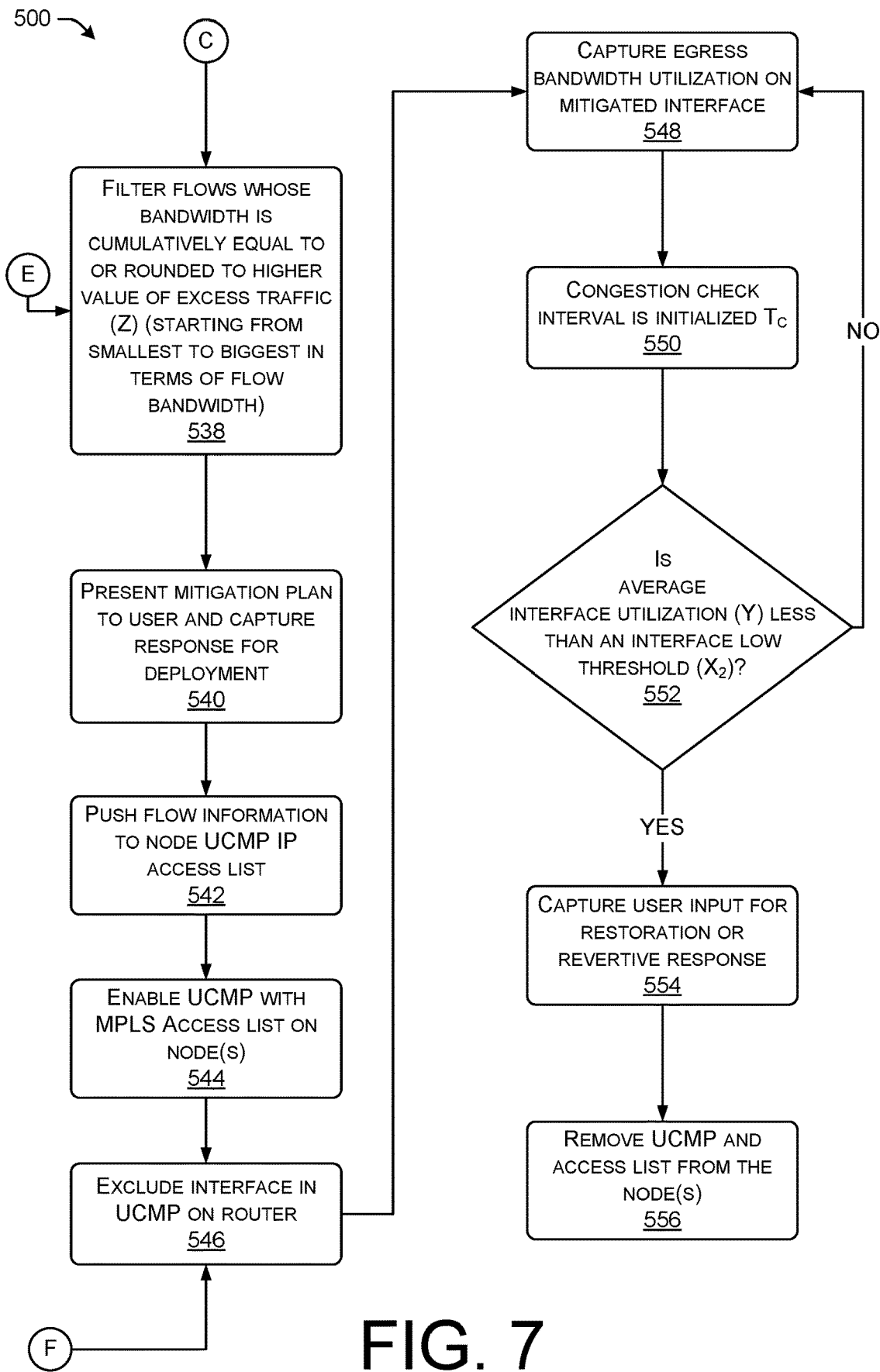

Having described an example method 300 for congestion mitigation for an internet protocol (IP)-based network, FIGS. 5 through 7 will now be described. FIGS. 5 through 7 illustrate a flow diagram of an example method 500 for congestion mitigation for a multiprotocol label switching (MPLS)-based network, according to an example of the principles described herein. The method 500 may include, at 502, the network controller 104 executing the interface utilization collector 108 to capture egress bandwidth utilization data on the interface of, for example, first node 112-1 where the congestion event 114 is detected. The egress bandwidth utilization metrics captured at 502 on the interface of the first node 112-1 may include any metric used to measure a rate of data transfer across a given path egressing from a node 112 such as, for example, the first node 112-1.

The topology collector 106 may also be executed by the network controller 104 in order to collect, store, and/or update IGP topology data 126 of the network 100 and determine the topology of the network 100 and the nodes 112 therein. This may allow for the identification of the location of the congestion event 114 among the nodes 112.

At 504 of FIG. 5, the network controller 104 may initialize a congestion check interval ($T_C$) during which the detecting of the congestion event and/or any network metrics may be performed. In one example, the congestion check interval ($T_C$) may be initialized by the network controller 104 executing one or more of the topology collector 106, the interface utilization collector 108, and the traffic flow collector 110. In one example, the interface utilization collector 108 may capture statistics defining southbound protocols (e.g., telemetry-based statistics, telemetry-based statistics, etc.).

In one example, the congestion check interval ($T_C$) may include any time window that can be used to aggregate sampled utilization data. In one example, the congestion check interval ($T_C$) may include a cadence or frequency at which congestion within the network 100 is checked for any congestion events. In one example, the frequency and/or duration of the congestion check interval ($T_C$) may be defined by an individual such as the administrator and may depend on one or more policies. For example, certain industries such as banking or investment industries may require more frequent and/or longer duration congestion check intervals ($T_C$) with respect to, for example, organizations within the manufacturing industry.

At 506, the network controller 104 may execute the interface utilization collector 108 to determine, during the congestion check interval ($T_C$), whether an average interface utilization (designated as "Y") such as an egress bandwidth utilization is greater than an interface high threshold (designated as "$X_1$"). In response to or based at least in part on a determination that the average interface utilization (Y) is not greater than the interface high threshold ($X_1$)(506, determination NO), then the method 500 may loop back to 502 to allow for the process to occur again during a subsequent congestion check interval ($T_C$).

The congestion check interval ($T_C$) may depend on a number of factors such as, for example, a number of samples required to compute the average interface utilization Y, the ample collection cadence or frequency, an expected threshold breach sensitivity (e.g., considering a single sample threshold breach as a congestion event or considering threshold breach of an average of multiple samples over time), other factors, and combinations thereof. In one example, these and other factors may be user-defined.

In response to or based at least in part on a determination that the average interface utilization (Y) is greater than the interface high threshold ($X_1$), then the network controller 104 may determine that a congestion event has occurred during the time window defined by the congestion check interval ($T_C$). For example, the congestion event 114 may be detected at one of the egress interfaces of the first node 112-1 between the first node 112-1 and the Nth node 112-N. In one example, if and when a congestion event 114 is detected, a user such as an administrator may be made aware of the congestion event 114 through, for example, a message transmitted to the administrator computing device 102. In one example, the interface high threshold ($X_1$) may be user-defined by, for example, the administrator. Further, the interface high threshold ($X_1$) may be defined for each of a plurality of interfaces for each of the nodes 112 within the network 100. The average interface utilization (Y) may be obtained by taking an average of all samples of interface utilization captured during the congestion check interval ($T_C$) for each of a plurality of interfaces of the nodes 112 such as the first node 112-1 in the present example.

In response to or based at least in part on a determination that the average interface utilization (Y) is greater than the interface high threshold ($X_1$) (506, determination YES), at 508, a congestion event is detected at the congestion check interval ($T_C$). At 510, the administrator may be presented with the message indicating that the congestion event 114 has occurred at the administrator computing device 102, the administrator may send, via the administrator computing device 102 a response to the message. Thus, at 510, the user (e.g., administrator) input may be captured regarding whether the network controller 104 may move forward with a mitigation response. At 510, the process may include two separate paths leading to 512 and 516.

As a first of the two branches, at 512, the method 500 may include identifying alternate links on the nodes 112. In one example, the network controller 104 may execute the topology collector 106 to identify the alternate links on the nodes 112, and in the example of FIG. 1, the alternate links associated with the first node 112-1 may be identified. In one example, the alternate links may be identified at 512 based on a topology table created by the topology collector 106 and stored as at least part of the IGP topology data 126. The topology collector 106 may identify in the topology table what IGP interfaces exist on the node 112 apart from the congested interface identified at 508. Further, the network controller 104 may execute the traffic flow collector 110 to identify the traffic flows that are traveling through and/or attempting to travel through the congested interface (e.g., the interface of the first node 112-1 of FIG. 1 that triggered the congestion event 114). In contrast to the traffic flow being identified in the example of FIGS. 2 through 4 using a 3-tuple, 4-tuple, or 5-tuple of the source address, source port, destination address, and destination port information (or, equivalently, a pair of network sockets for the source and destination, each of which is made up of an address and a port), in the MPLS example of FIGS. 5 through 7, the traffic flows may be identified using MPLS labels. MPLS is a routing technique that directs data from one node 112 to another node 112 based on labels rather than network addresses. While network addresses may identify endpoints the MPLS labels identify established paths between endpoints. Further, MPLS is capable of encapsulating packets of various network protocols. In an MPLS network such as the example of FIGS. 5 through 7, MPLS labels may be assigned to data packets, and packet-forwarding decisions may be made solely on the contents of this label, without the need to examine the packet itself.

As a second of the two branches, at 516, the method 500 may include, with the network controller 104, identifying excess bandwidth (designated as "Z") or traffic that may be offloaded from the node 112 associated with the congestion event 114 (e.g., the first node 112-1). Based on the average interface utilization (Y) and the interface high threshold ($X_1$) calculated at 506, the excess bandwidth may be calculated using Eq. 1 provided above.

The value obtained at 516 defining the excess bandwidth (Z) that is to be offloaded from the node 112 associated with the congestion event 114 may be input to 514 where the network controller 104 may determine if the excess bandwidth (Z) at the interface of the node 112 associated with the congestion event 114 may be accommodated on any other alternate link identified at 512 without breaching the interface high threshold ($X_1$) for the congestion check interval ($T_C$). In response to or based at least in part on a determination that the excess bandwidth (Z) may not be accommodated on any other alternate link without breaching the interface high threshold ($X_1$) for the congestion check interval ($T_C$) (514, determination NO), the interfaces of at least those alternate links that cannot not accommodate such excess bandwidth (Z) may, at 538 of FIG. 6 (following flow marker "A"), be recorded as interfaces that are to be considered for exclusion from a congestion mitigation plan (e.g., excluded form UCMP load balancing) as viable options. Further, following flow marker F, at 550 of FIG. 7, the interfaces recorded at 538 may be subsequently excluded from the congestion mitigation plan (e.g., excluded form UCMP load balancing) on the node 112 and/or the network controller 104.

For example, in a situation where a node 112 where a congestion event is detected includes three interfaces. In this example, a first interface of this node 112 may have an 80% utilization when the interface threshold of the first interface may be 60%. This means that the first interface is congested by 20% and this 20% should be offloaded. Thus, the bandwidth threshold of the second interface and the third interface may be checked to see if either of these interfaces may take the 20% load off of the first interface. If the second interface has an interface threshold of 80% and is handling 80% of load, then the second interface of the node 112 is not a viable candidate for offloading the 20% from the first threshold since doing so would bring the second interface above its interface threshold. However, if the third interface has an interface threshold of 70% and is actively handling 40% of a load, then the system may offload the 20% from the first interface to the third interface since the third interface is able to handle 30% more of the load. Thus, at 514, such an analysis is performed for each interface for each node 112 and each alternate link within the network 100 in order to alleviate the congestion detected at 508.

The above example may be described with a caveat: that individual flows may not be divided or split between multiple interfaces and a single flow must be transmitted via a single interface even if that flow requires a large percentage of bandwidth. Thus, in the examples described herein, it may be possible that the excess bandwidth (Z) is a single flow, and an evaluation may occur where the network controller 104 may determine if there exists an alternate link that can handle the entirety of the traffic flow. Further, in one example, the excess bandwidth (Z) may include multiple flows allowing for at least one of the flows to be separated from the group of flows making up the excess demand (Z) and redirected via the alternate link or interface. Given the above, the determination at 514 may allow for at least one flow to be separated from the excess bandwidth (Z) and redirected via another interface in situations where the excess bandwidth (Z) is represented by that single flow, and that single flow may be directed via a single interface of one of the alternate links identified at 512.

Turning again to 516 of FIG. 5 and having identified all the alternate links on the node(s) 112 at 512, the network controller 104, executing the interface utilization collector 108 and/or the traffic flow collector 110, may also, at 518, identify all flows passing through the congested interface (e.g., the interface of the first node 112-1) during the congestion check interval ($T_C$). At 518, the network controller 104 may identify all flow data received during the time window defined by the congestion check interval ($T_C$) where the congestion event 114 has been detected.

At 520, the network controller 104 may apply business logic (BL) macro flow filtering to filter out flows among those flows included in the excess bandwidth (Z) that match a business rule set by a user such as the administrator. In one example, the administrator may define a number of the business rules at the administrator computing device 102 and provide those rules to the network controller 104. The network controller 104 may execute the business rules at 520 via the business logic macro flow filtering in order to filter out, for example, low-priority traffic as opposed to relatively higher-priority traffic. In one example, the low-priority traffic and the relatively higher-priority traffic may be defined by a quality-of-service (QoS) requirement and/or the service-level agreements (SLAs) and user-input. Examples of low-priority traffic may include, for example, experimental bits (EXP) values defined for the traffic flows that have class of service (CoS) values assigned. For example, an EXP value of 000 may define a "best-effort" forwarding class of the EXP and a loss priority of "low." An EXP value of 101 may define an "assured-forwarding" forwarding class of the EXP and a loss priority of "high." Any number of ExP values may be used to define the low and high priority traffic flows. In an example where a user or administrator desires that traffic flow associated with real-time calling or video conferencing is not subjected to the business logic macro flow filtering of 520, the business rules may be designed to reflect those desires and disqualify these types of traffic flows from filtering. In contrast, the business rules may be designed to filter out traffic flows associated with browsing, for example, to be subjected to conditional mitigation or redirected to other interfaces via the execution of the business rules. The business logic defining these IPP precedent values may be utilized by the network controller 104 when executing the BL macro flow filtering at 520. In one example, the administrator may define the business logic and business rules associated with the business logic macro flow filtering of 520, and, in one example, may be predefined by the administrator before execution of the business logic macro flow filtering.

At 522, the network controller 104 may identify destination node (e.g., egress label switching router(s) (LSRs)) prefix using flow top label to destination node prefix mapping. In one example, the network controller 104 may parse the MPLS topmost label from the traffic flow records obtained from the execution of the traffic flow collector 110. Based at least in part on the label-to-prefix mapping collected from the traffic flow collector 110 on the congested node (e.g., the first node 112-1), the network controller 104 may prepare a list of all destination nodes (e.g., the egress LSRs) prefixes for further processing. In one example, the This label-to-prefix mapping may be saved in a topology table by the topology collector 106 of the network controller 104.

The method may further include a second filtering process at 524 and 526. The method 500 proceeds to 524 of FIG. 6 in response to or based at least in part on a determination that the excess bandwidth (Z) may be accommodated on any other alternate link without breaching the interface high threshold ($X_1$) for the congestion check interval ($T_C$) (514, determination YES) (following flow marker "B") and/or following the identify IGP destination node prefixes at 524 (following flow marker "D"). At 524, the method 500 may further include determining if each alternate link identified at 512 passes a loop-free path-finding algorithm (LPA) analysis for all prefixes. Thus, at 524, it may be determined if each alternate link passes the LPA analysis. The alternate links described herein may conform to at least a loop-freeness condition that guarantees that forwarding traffic to a loop-free alternate (LFA) does not result in a loop after link failure.

In one example, the network controller 104 may perform the LPA analysis at 524 using a diffusing update algorithm (DUAL)-based LPA. DUAL LPA utilized in enhanced interior gateway routing protocol (EIGRP) developed and distributed by Cisco Systems, Inc. may be based on diffusing computations for internodal synchronization and utilizes distances to destinations to operate. DUAL synchronizes routers that modify their distance information in a way that no long-term or temporary loops are created in routing tables.

In response to or based at least in part on a determination that an alternate link does not pass the LPA analysis (524, determination NO), that alternate link and/or any other alternate link that does not pass at 524 may be recorded as interfaces that are to be considered for exclusion from the congestion mitigation plan (e.g., excluded form UCMP load balancing) as viable options at 536. Further, following flow marker F, at 542 of FIG. 7, the interfaces recorded at 536 may be subsequently excluded from the congestion mitigation plan (e.g., excluded form UCMP load balancing) on the node 112 and/or the network controller 104.

In response to or based at least in part on a determination that an alternate link does pass the LPA analysis (524, determination YES), the alternate links that do pass 524 may be analyzed to determine if each destination node prefix associated with the IP addresses of the destination node and the alternate links pass the LPA at 526. As similarly described above, the network controller 104 may perform the LPA analysis at 526 using a diffusing update algorithm (DUAL)-based LPA.

The examples of FIGS. 8 and 9 described above may be applied to the method 500 at 524 and 526 as well. Thus, as an example of how the network controller 104 may perform the computations based on LPA to check the feasibility of the interfaces and to ensure a loop-free alternate path for all prefixes, FIG. 8 illustrates a diagram of a network 800 including a number of node(s) 802-1, 802-2, 802-3, 802-4, and 802-N, where N is any integer greater than or equal to 1 (collectively referred to herein as node(s) 802 unless specifically addressed otherwise) depicting determination of feasibility of a number of interfaces to ensure a loop-free alternate path for a number of prefixes, according to an example of the principles described herein. FIG. 9 illustrates a diagram of a network including a number of nodes 802 depicting validation of destination node prefixes against the DUAL-based LPA analysis for all identified interfaces, according to an example of the principles described herein. In the example of FIGS. 8 and 9, a congestion event 806 may have occurred and/or may have been detected between a second node 802-2 and a fourth node 802-4. Due to the requirement that the alternate links used to mitigate the congestion event 806 are to be loop-free alternate paths, the alternate link between the second node 802-2 and the first node 802-1 may be excluded from consideration as such an alternate link since redirection of the traffic flow to the first node 802-1 would merely cause the traffic flow to be looped back to the second node 802-2 continually. Thus, as indicated by 804, the link between the second node 802-2 and the first node 802-1 is excluded.

Further, as depicted in FIGS. 8 and 9, the costs for the various alternate links are shown. For example, the cost of the alternate link between the second node 802-2 and the first node 802-1 is 10; the cost of the alternate link between the second node 802-2 and the third node 802-3 is 14; the cost of the alternate link between the second node 802-2 and the fourth node 802-4 is 9; the cost of the alternate link between the second node 802-2 and the fifth node 802-5 is 16; and the cost of the alternate link between the second node 802-2 and the sixth node 802-6 is 19. Further, the cost of the alternate link between the third node 802-3 and the fourth node 802-4 is 1; and, similarly, the cost of the alternate link between the fifth node 802-5 and the sixth node 802-6 is also 1. Thus, another way to state that the alternate link between the second node 802-2 and the first node 802-1 for destination node prefixes "X," "Y," and "Z," may be excluded since the next hop from the second node 802-2 to a first node 802-1 does not meet the DUAL/LPA condition of PFX_IGP_Cost (802-1, Destination node prefix)<PFX_IGP_Cost (802-1, 802-2)+PFX_IGP_Cost (802-2, Destination node prefix).

Further, extending this example to other alternate paths, PFX_IGP_Cost (802-2, Destination node prefix) is the shortest path distance from the second node 802-2 to the destination node prefixes (X,Y,Z). PFX_IGP_Cost (802-1, Destination node prefix) is the shortest path distance from the neighbor node (e.g., the first node 802-1) to the destination node prefixes (X,Y,Z). PFX_IGP_Cost (802-1, 802-2) is the shortest path distance from the neighbor node (e.g., the first node 802-1) to the second node 802-2 for which congestion mitigation is being analyzed. Thus, the alternate link between the second node 802-2 and the first node 802-1 is excluded from consideration within a congestion mitigation plan. Thus, at 528, if an alternate link does not qualify for any or all the destination node prefixes (e.g., destination node prefixes (X,Y,Z)) (528, determination NO, then those unqualifying alternate links may be recorded as interfaces that are to be considered for exclusion from the congestion mitigation plan (e.g., excluded form UCMP load balancing) as viable options. Further, following flow marker F, at 542 of FIG. 7, the interfaces recorded at 536 may be subsequently excluded from the congestion mitigation plan (e.g., excluded form UCMP load balancing) on the node 112 and/or the network controller 104. It may be noted that although the alternate link between the second node 802-2 and the first node 802-1 was identified as being able to accommodate the excess bandwidth (Z) without breaching an interface high threshold ($X_1$) at 514, it may still be excluded due to the LPA analysis performed at 524.

In response to or based at least in part on a determination that an alternate link does not pass the LPA analysis for any or all of the destination node prefixes (524, determination NO), then the corresponding traffic flow associated with that alternate link and destination node prefix along with any corresponding traffic flows may be discarded from the mitigation plan (e.g., excluded form UCMP load balancing) on the node 112 and/or the network controller 104 as indicated by 536 and 542. In response to or based at least in part on a determination that an alternate link does pass the LPA analysis for any or all of the destination node prefixes (524, determination YES), then the method may proceed to 526. The process at 524 may be referred to as interface-level filtering.

At 526, a determination may be made as whether each destination node prefix (e.g., destination node prefixes (X,Y,Z)) passes LPA analysis for all the alternate links. In one example, the process of 528 may be performed for all alternate links or next hops within the network. Thus, in contrast to the interface-level filtering of 524, 526 may be referred to as flow-level filtering. At 526, the network controller 104 may perform this computation based on the DUAL/LPA algorithms to check the feasibility of the prefixes in order to ensure a loop-free alternate path on all interfaces identified from 524. With reference again to FIGS. 8 and 9, it may be noted that the fifth node 802-5 and the sixth node 802-6 acting as next hops (per DUAL/LPA) cannot provide a loop-free alternate path for prefix Z. Further, the third node 802-3 and the fourth node 802-4 acting as next hops (per DUAL/LPA) cannot provide a loop-free alternate path for prefix X. However, all of the third node 802-3, the fourth node 802-4, the fifth node 802-5, and the sixth node 802-6 acting as next hops (per DUAL/LPA) can provide a loop-free alternate path for prefix Y. As to prefix X, the fifth node 802-5 and the sixth node 802-6 may fail as candidates since a path to prefix X through either of the fifth node 802-5 or the sixth node 802-6 would not be loop free. Similarly, as to prefix Z and with the further node 802-4 including the congested path, the third node 802-3 may fail as a candidate since a path to prefix Z through the third node 802-3 would not be loop free as well. Thus, the flows corresponding to prefix X and prefix Z may be excluded from consideration (526, determination NO) at 534. Further, because prefix Y is reachable by all of the third node 802-3, the fourth node 802-4 (via the third node 802-3), the fifth node 802-5, and the sixth node 802-6, prefix Y passes the determination at 526 (526, determination YES) (e.g., the traffic flows corresponding to prefix Y are not excluded).

At 526, for a given destination node prefix that has been excluded from consideration (e.g., destination node prefixes X and Z) at 534, the corresponding traffic flow will continue to flow via the pre-mitigation IGP path (e.g., the path between the second node 802-2 and the fourth node 802-4 that is congested). Conversely, for a given destination node prefix that has not been excluded from consideration (e.g., destination node prefix Y), the corresponding traffic flow may be considered for the mitigation plan (e.g., UCMP consideration). It may also be noted that if none of the destination node prefixes may be considered as candidates for the mitigation plan (e.g., UCMP consideration), then the congestion event 806 simply remains, no mitigation plan is implemented, and the traffic flows continues to flow between the second node 802-2 and the fourth node 802-4.

For those traffic flows and corresponding destination node prefixes that qualify at 526, the network controller 104, at 528, may record the traffic flows as mapped to destination node labels for the mitigation plan (e.g., UCMP consideration) as opposed the destination node prefix schema used in connection with the example of FIGS. 2 through 4. For each of the traffic flows considered at 528, each may include at least one destination node label under MPLS. In one example, the mapping of the traffic flows and destination node labels may be stored at the network controller 104.

The network controller 104 may, at 530, calculate all the flow bandwidths for all the flows recorded at 528 for the congestion check interval ($T_C$). The network controller 104 may analyze flow data received during the congestion check interval ($T_C$) where the congestion event 114 has been detected. Flow data may include an egress interface identifier (ID) along with a timestamp of a first switched packet (% FIRST_SWITCHED), timestamp of last switched packet (% LAST_SWITCHED), and a value defining the total sent bytes (% OUT_BYTES). In one example, this data may be obtained by the network controller 104 executing the traffic flow collector 110. Using this data, the bandwidth of each traffic flow may be calculated using Eq. 2 provided above. Stated another way, the egress bandwidth per second (e.g., OUT_BPS) may be calculated by multiplying the total sent bytes (e.g., OUT_BYTES) by 8 to obtain the number of bits and dividing that value by the time value of the difference between the last switched packet (e.g., LAST_SWITCHED) and the first switched packet (e.g., FIRST_SWITCHED).

At 532, the traffic flows may be arranged in ascending order of flow bandwidths as determined at 530. In one example, the ascending order may be any order where the traffic flows are arranged in either lowest-to-highest or highest-to-lowest order. The traffic flows may be ordered according to their calculated bandwidths. At 538 and of FIG. 7 (following flow markers "E" from 532 and "C" from 516), the network controller 104 may perform bandwidth-based flow filtering by filtering traffic flows whose bandwidth is cumulatively equal to or rounded to a higher value of the excess bandwidth (Z) as identified at 516 starting from smallest to biggest in terms of flow bandwidth. As mentioned above, because individual traffic flows may not be divided, an objective may be to collect as many smaller-bandwidth flows whose cumulative bandwidths add up to the excess bandwidth (Z). In this manner, a relatively larger number of traffic flows may be redirected rather than selecting relatively larger-bandwidth traffic flows where relatively fewer traffic flows may be redirected. Generally, the more traffic flows that may be redirected across alternate links, a more effective mitigation plan may be achieved by allowing for a more even distribution of traffic flows throughout the network 100.

A mitigation plan including the redirection of the traffic flows identified through the bandwidth-based flow filtering of 538 may be presented to a user such as the administrator at 540. In one example, the mitigation plan may be presented to the administrator via the administrator computing device 102. In one example, the mitigation plan may be presented to the administrator via a dashboard, an application program interface (API), a webhook, an email, a messaging bus interface such as, for example, Apache Kafka or advanced message queuing protocol (AMQP), other communications methods and systems, and combinations thereof. Further, at 540, the network controller 104 may receive or capture a response from the administrator regarding the deployment of the mitigation plan. In one example, the administrator or other user may preview the recommendations and either call for a commit action or an abort action.

In one example, control may be given to the administrator to approve the mitigation plan and/or post which mitigation plan deployment will be initialized. With regard to the flow data, in some scenarios, the traffic flows identified during the congestion check interval ($T_C$) may be terminated at the time of deployment of the mitigation plan due to various reasons such as, for example, a connection reset within the network 100. Further, the traffic flow volume may change from the time of congestion detection to the time of deployment of the mitigation plan. However, the effectiveness of the present systems and methods may not be impacted since the present systems and methods addresses congestion mitigation at a volumetric level and is not targeted to specific traffic flows.

Assuming the administrator has instructed the network controller 104 to move forward with the mitigation plan, at 542, the flow information defining the redirection of the traffic flows identified through the bandwidth-based flow filtering of 538 may be pushed to the IP access lists (e.g., UCMP MPLS access lists) of the nodes including the congested node (e.g., the first node 112-1 of FIG. 1 and the second node 802-2 of FIGS. 8 and 9). In one example, nodes 112 may have the capability to conditionally apply the mitigation plan (e.g., UCMP) based at least in part on the flow information that includes MPLS flow label information. Thus, in the case of a commit action being received from the administrator, the network controller 104 may instantiate rendering of configuration on the node (e.g., a UCMP router) using a standards-based southbound protocol that may facilitate communication between the network controller 104 and the infrastructure including the nodes 112. The network controller 104 may use this protocol to push the configuration to match excess flows, install additional links in a routing information base (RIB) and/or a forwarding information base (FIB) for the destinations associated with the excess flows. Further, the network controller 104 may configure the configurations using UCMP. The methods by which communication between the network controller 104 and the infrastructure may be facilitated may vary depending on the capabilities of the network controller 104 and the platform. Other methods of communication between the network controller 104 and the infrastructure may include using command line interface (CLI) protocols, RESTCONF protocols, and/or NETCONF protocols, among others.

At 544, the mitigation plan (e.g., the UCMP) may be enabled using the IP access lists stored at the nodes 112. At 546, any other interfaces that were not identified as candidates including any interfaces rejected by the administrator at 540 may be excluded from the congestion mitigation plan (e.g., excluded form UCMP load balancing) on the node 112 and/or the network controller 104. At 546, two types of interfaces may be excluded. A first type of interface that may be excluded may include interfaces that cannot accommodate the excess bandwidth (Z) without exceeding the threshold as described in connection with 514. A second type of interface that may be excluded may include interfaces that does not qualify following the interface LPA analysis of 524 and/or the destination node prefix LPA analysis of 526.

With the mitigation plan enabled, there may come a point where congestion at the congested node (e.g., the first node 112-1 of FIG. 1 and the second node 802-2 of FIGS. 8 and 9) exists. Therefore, the present systems and methods provide for reversion of the mitigated state back to a pre-mitigated state or a second mitigated state. At 548, the network controller 104 executing the interface utilization collector 108 may again capture egress bandwidth utilization data on the interface of, for example, the first node 112-1 where the congestion event 114 was originally detected and in a manner similar to 502. At 550 of FIG. 7, the network controller 104 may initialize another congestion check interval ($T_C$) during which the detecting of the congestion event and/or any network metrics may be performed.

At 552, and in a manner similar to 506 of FIG. 5, the network controller 104 may execute the interface utilization collector 108 to determine, during the congestion check interval ($T_C$), whether the average interface utilization (Y) such as an egress bandwidth utilization is greater than an interface low threshold (designated as "$X_2$"). In response to or based at least in part on a determination that the average interface utilization (Y) is not lower than the interface low threshold ($X_2$)(552, determination NO), then the method 500 may loop back to 548 to allow for the process to occur again during a subsequent congestion check interval ($T_C$).

In response to or based at least in part on a determination that the average interface utilization (Y) is lesser than the interface low threshold ($X_2$) (552, determination YES), at 554, the administrator may be made aware of the alleviation of the congestion event and the network controller 104 may receive input from the administrator to restore the network 100 to its pre-mitigation state or revert the state of the mitigation plan back to a pre-mitigation state. A pre-mitigation state may include the routes utilized by traffic flows before the mitigation plan was congestion event is detected at the congestion check interval ($T_C$). Thus, if the average interface utilization (Y) is greater than the interface high threshold ($X_1$), then a congestion event 114 is present within the network 100, and if the average interface utilization (Y) is lesser than the interface low threshold ($X_2$), then the congestion event 114 no longer exists and revertive or restorative action may be taken.

Assuming the administrator has instructed the network controller 104 to take restorative or revertive action, at 556 the network controller 104 may remove the mitigation plan (e.g., UCMP) and access lists from the node(s) 112. By doing so, the traffic flows will shift back to their respective pre-mitigation states. The method of FIGS. 5 through 7 may be performed any number of times and throughout any number of congestion check intervals ($T_C$).

Figure 10:
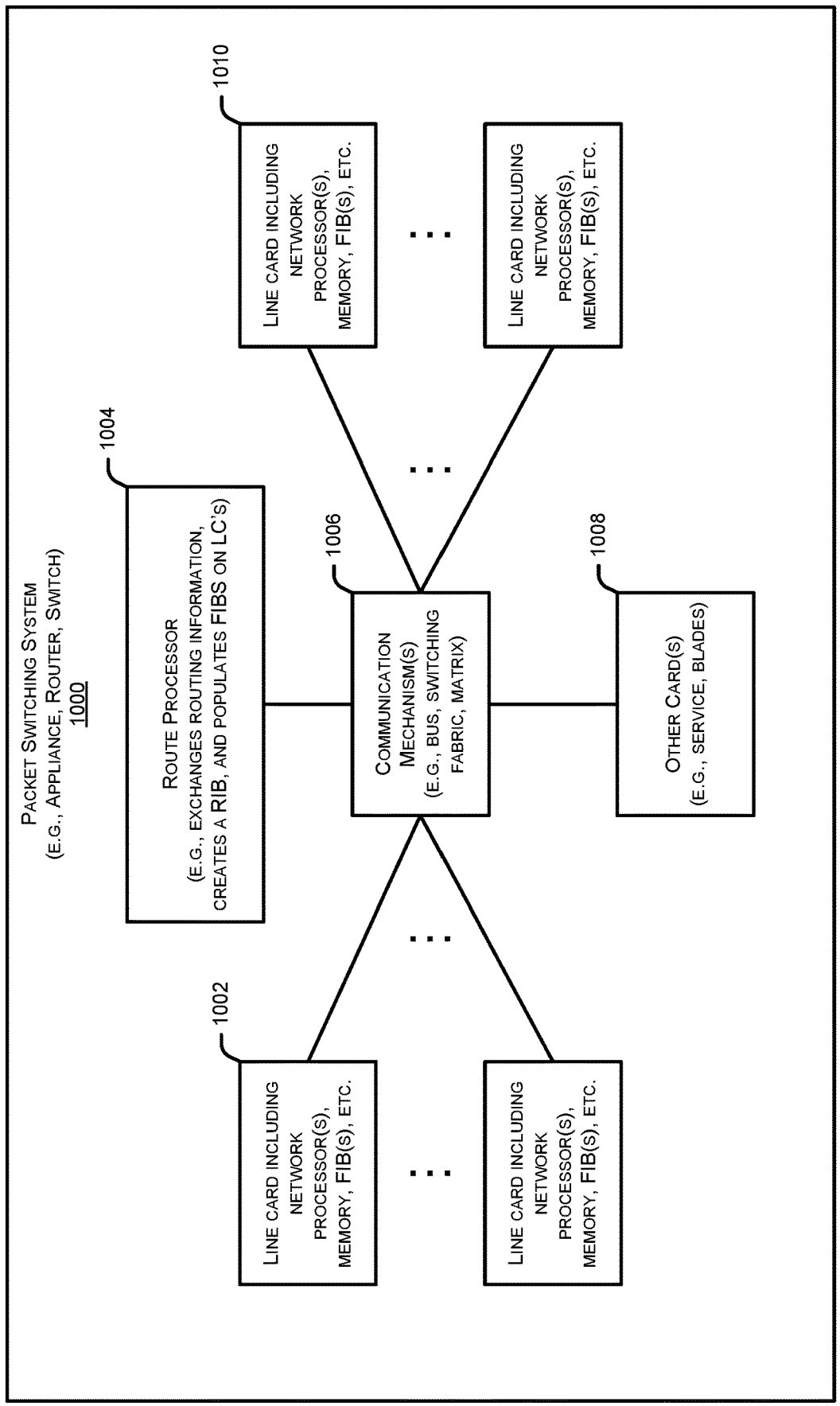
FIG. 10 illustrates a block diagram depicting an example packet switching system that can be utilized to implement various aspects of the technologies disclosed herein.

FIG. 10 illustrates a block diagram illustrating an example packet switching device (or system) 1000 that can be utilized to implement various aspects of the technologies disclosed herein. In some examples, packet switching device(s) 1000 may be employed in various networks, such as, for example, network 100 as described with respect to FIG. 1.

In some examples, a packet switching device 1000 may comprise multiple line card(s) 1002, 1010, each with one or more network interfaces for sending and receiving packets over communications links (e.g., possibly part of a link aggregation group). The packet switching device 1000 may also have a control plane with one or more processing elements for managing the control plane and/or control plane processing of packets associated with forwarding of packets in a network. The packet switching device 1000 may also include other cards 1008 (e.g., service cards, blades) which include processing elements that are used to process (e.g., forward/send, drop, manipulate, change, modify, receive, create, duplicate, apply a service) packets associated with forwarding of packets in a network. The packet switching device 1000 may comprise hardware-based communication mechanism 1006 (e.g., bus, switching fabric, and/or matrix, etc.) for allowing its different entities 1002, 1004, 1008 and 1010 to communicate. Line card(s) 1002, 1010 may typically perform the actions of being both an ingress and/or an egress line card 1002, 1010, in regard to multiple other particular packets and/or packet streams being received by, or sent from, packet switching device 1000.

Figure 11:
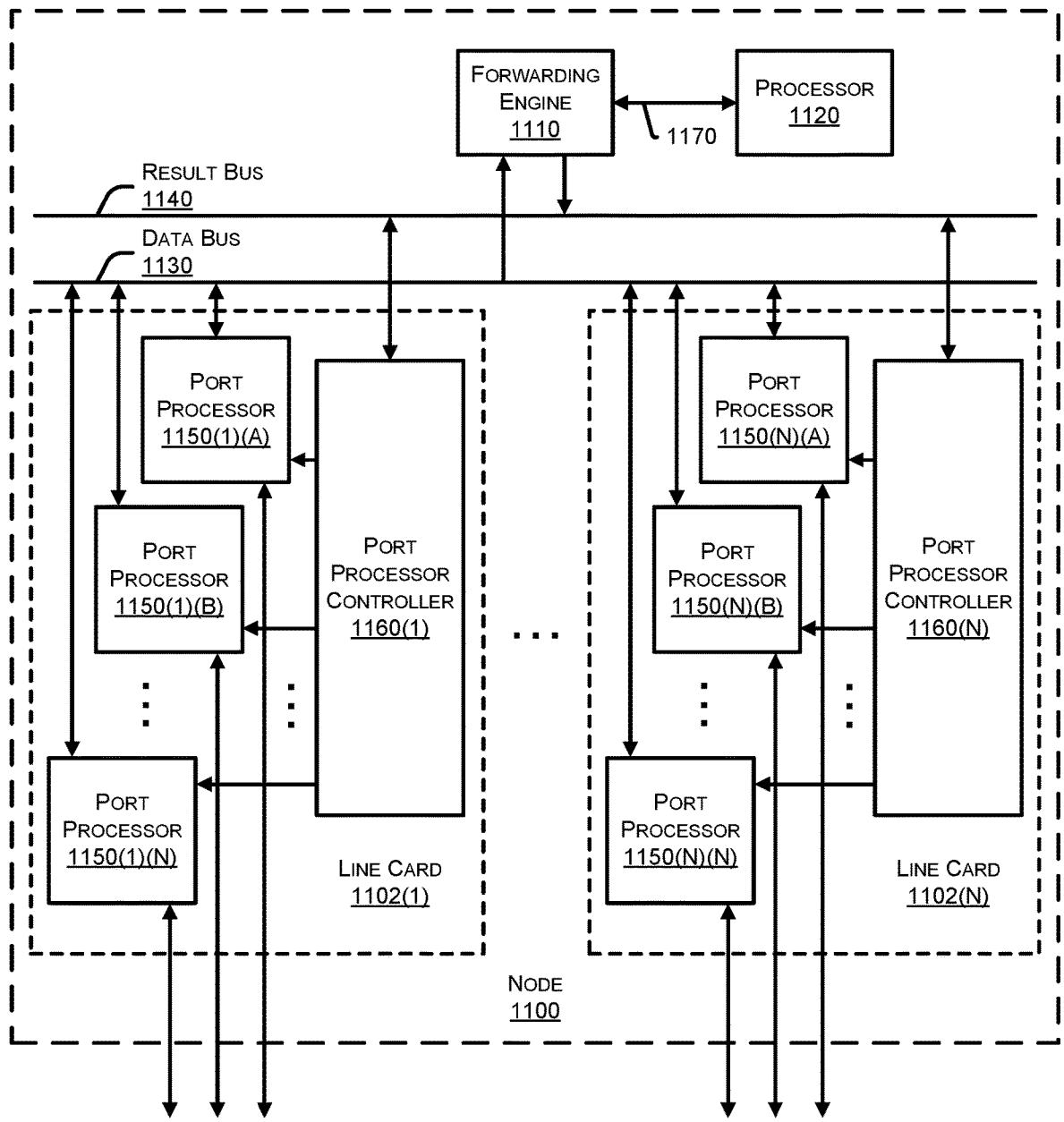
FIG. 11 illustrates a block diagram illustrating certain components of an example node that can be utilized to implement various aspects of the technologies disclosed herein.

FIG. 11 illustrates a block diagram illustrating certain components of an example node 1100 that can be utilized to implement various aspects of the technologies disclosed herein. In some examples, node(s) 1100 may be employed in various networks, such as, for example, network 100 as described with respect to FIG. 1.

In some examples, node 1100 may include any number of line cards 1102 (e.g., line cards 1102(1)-(N), where N may be any integer greater than 1) that are communicatively coupled to a forwarding engine 1110 (also referred to as a packet forwarder) and/or a processor 1120 via a data bus 1130 and/or a result bus 1140. Line cards 1102(1)-(N) may include any number of port processors 1150(1)(A)-(N)(N) which are controlled by port processor controllers 1160(1)-(N), where N may be any integer greater than 1. Additionally, or alternatively, forwarding engine 1110 and/or processor 1120 are not only coupled to one another via the data bus 1130 and the result bus 1140, but may also communicatively coupled to one another by a communications link 1170.

The processors (e.g., the port processor(s) 1150 and/or the port processor controller(s) 1160) of each line card 1102 may be mounted on a single printed circuit board. When a packet or packet and header are received, the packet or packet and header may be identified and analyzed by node 1100 (also referred to herein as a router) in the following manner. Upon receipt, a packet (or some or all of its control information) or packet and header may be sent from one of port processor(s) 1150(1)(A)-(N)(N) at which the packet or packet and header was received and to one or more of those devices coupled to the data bus 1130 (e.g., others of the port processor(s) 1150(1)(A)-(N)(N), the forwarding engine 1110 and/or the processor 1120). Handling of the packet or packet and header may be determined, for example, by the forwarding engine 1110. For example, the forwarding engine 1110 may determine that the packet or packet and header should be forwarded to one or more of port processors 1150(1)(A)-(N)(N). This may be accomplished by indicating to corresponding one(s) of port processor controllers 1160(1)-(N) that the copy of the packet or packet and header held in the given one(s) of port processor(s) 1150(1)(A)-(N)(N) should be forwarded to the appropriate one of port processor(s) 1150(1)(A)-(N)(N). Additionally, or alternatively, once a packet or packet and header has been identified for processing, the forwarding engine 1110, the processor 1120, and/or the like may be used to process the packet or packet and header in some manner and/or may add packet security information in order to secure the packet. On a node 1100 sourcing such a packet or packet and header, this processing may include, for example, encryption of some or all of the packet's or packet and header's information, the addition of a digital signature, and/or some other information and/or processing capable of securing the packet or packet and header. On a node 1100 receiving such a processed packet or packet and header, the corresponding process may be performed to recover or validate the packet's or packet and header's information that has been secured.

Figure 12:
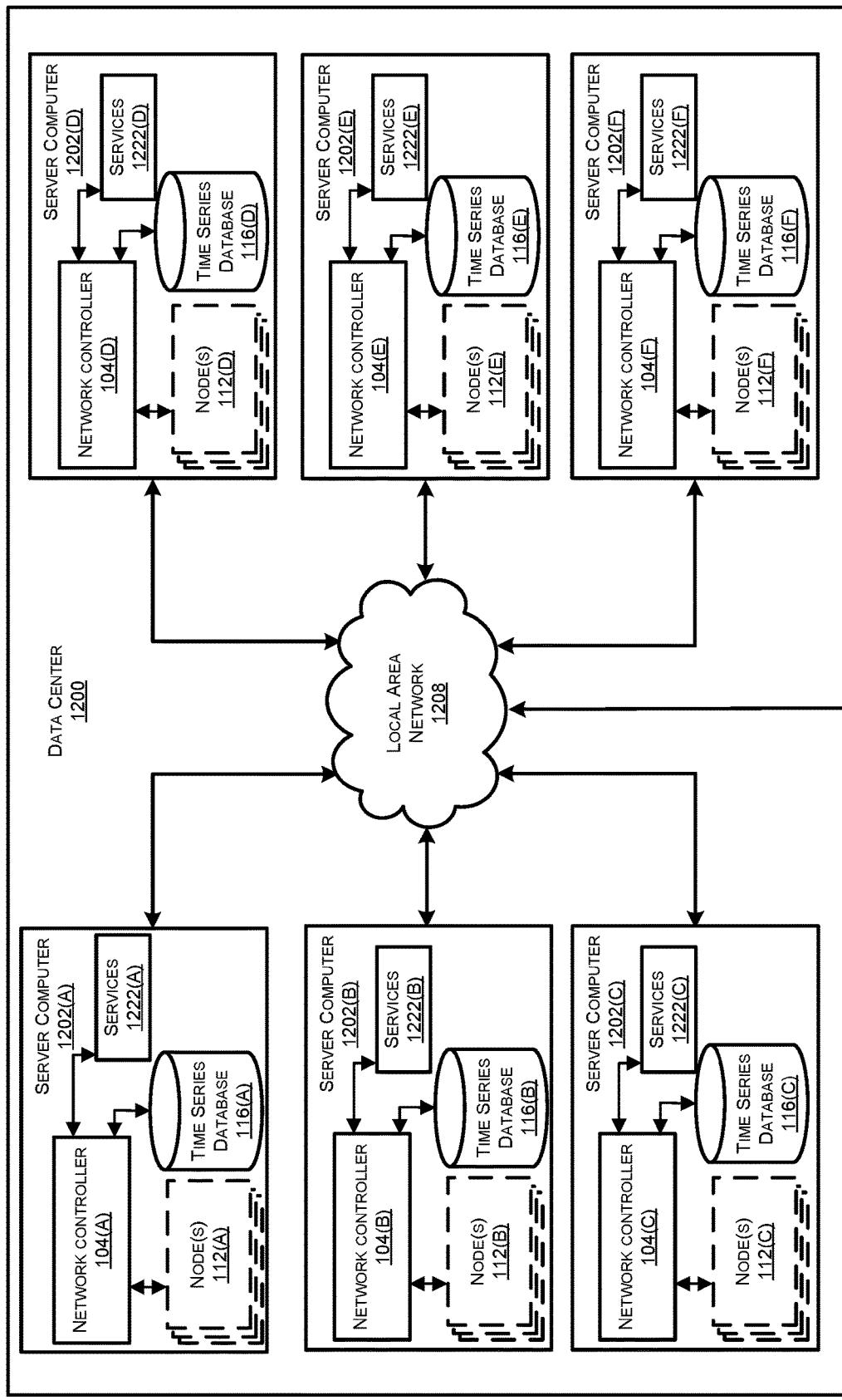
FIG. 12 illustrates a computing system diagram illustrating a configuration for a data center that can be utilized to implement aspects of the technologies disclosed herein.

FIG. 12 is a computing system diagram illustrating a configuration for a data center 1200 that can be utilized to implement aspects of the technologies disclosed herein. The example data center 1200 shown in FIG. 12 includes several server computers 1202A-1202E (which might be referred to herein singularly as "a server computer 1202" or in the plural as "the server computers 1202") for providing computing resources. In some examples, the server computers 1202 may include, or correspond to, the servers associated with the site, the packet switching system 1000, and/or the node 1100 described herein with respect to FIGS. 1, 10 and 11, respectively.

The server computers 1202 can be standard tower, rackmount, or blade server computers configured appropriately for providing the computing resources described herein. As mentioned above, the computing resources provided by the data center 1200 can be data processing resources such as VM instances or hardware computing systems, database clusters, computing clusters, storage clusters, data storage resources, database resources, networking resources, and others. Some of the servers 1202 can also be configured to execute a resource manager capable of instantiating and/or managing the computing resources. In the case of VM instances, for example, the resource manager can be a hypervisor or another type of program configured to enable the execution of multiple VM instances on a single server computer 1202. Server computers 1202 in the data center 1200 can also be configured to provide network services and other types of services.

In the example data center 1200 shown in FIG. 12, an appropriate LAN 1208 is also utilized to interconnect the server computers 1202A-1202E. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 1200, between each of the server computers 1202A-1202E in each data center 1200, and, potentially, between computing resources in each of the server computers 1202. It should be appreciated that the configuration of the data center 1200 described with reference to FIG. 12 is merely illustrative and that other implementations can be utilized.

In some examples, the server computers 1202 may each execute a network controller 103, one or more node(s) 112, one or more time series database(s) 116, and/or one or more services 1222. In one example, the services 1222 may include any congestion mitigation services described herein.

In some instances, the data center 1200 may provide computing resources, like application containers, VM instances, and storage, on a permanent or an as-needed basis. Among other types of functionality, the computing resources provided by the data center 1200 may be utilized to implement the various services described above. The computing resources provided by the data center 1200 can include various types of computing resources, such as data processing resources like application containers and VM instances, data storage resources, networking resources, data communication resources, network services, and the like.

Each type of computing resource provided by the data center 1200 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The data center 1200 can also be configured to provide other types of computing resources not mentioned specifically herein.

The computing resources provided by the data center 1200 may be enabled in one embodiment by one or more data centers 1200 (which might be referred to herein singularly as "a data center 1200" or in the plural as "the data centers 1200"). The data centers 1200 are facilities utilized to house and operate computer systems and associated components. The data centers 1200 typically include redundant and backup power, communications, cooling, and security systems. The data centers 1200 can also be located in geographically disparate locations. One illustrative embodiment for a data center 1200 that can be utilized to implement the technologies disclosed herein will be described below with regard to FIG. 13.

Figure 13:
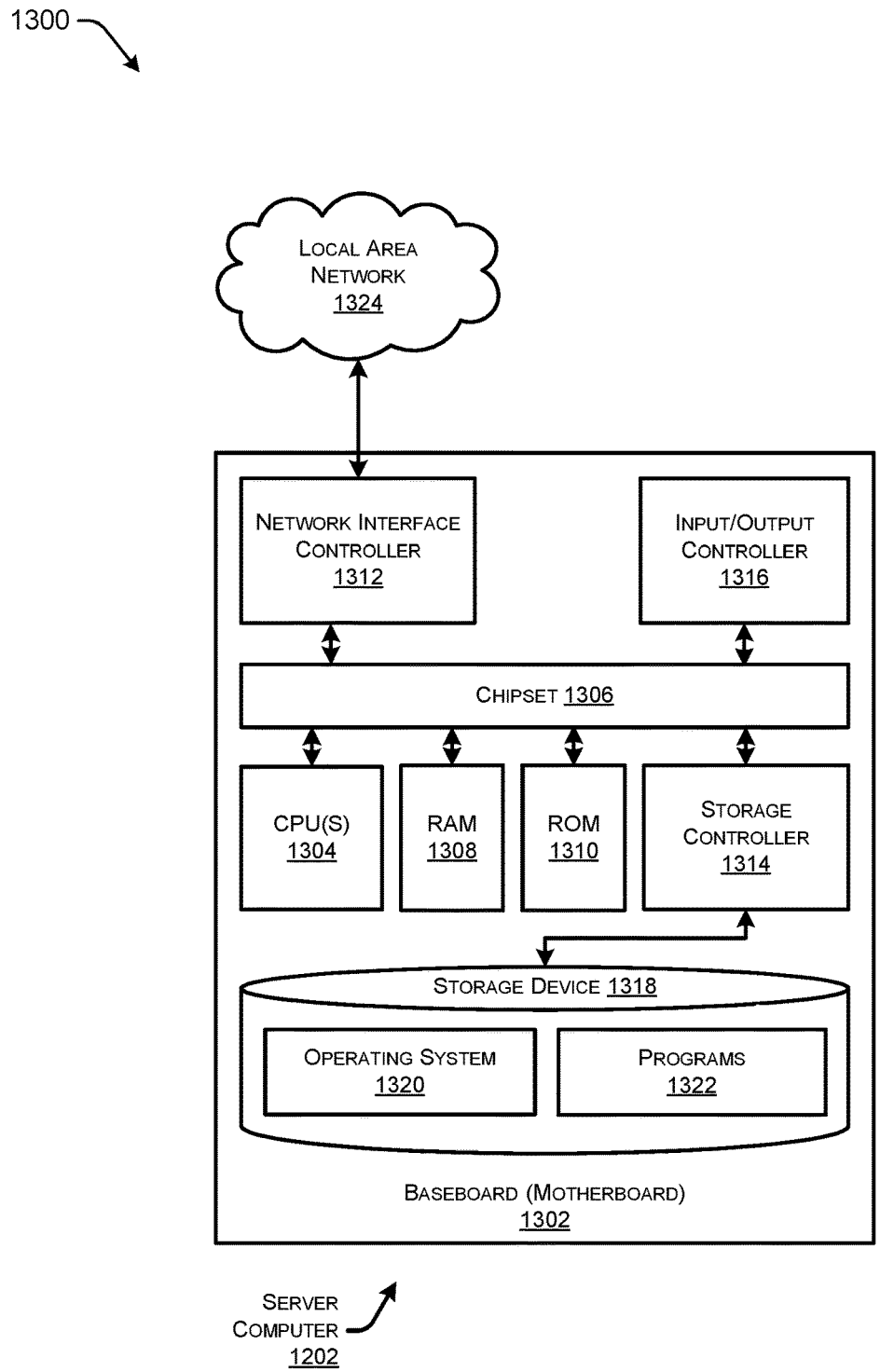
FIG. 13 is a computer architecture diagram showing an illustrative computer hardware architecture for implementing a server device that can be utilized to implement aspects of the various technologies presented herein.

FIG. 13 is a computer architecture diagram showing an illustrative computer hardware architecture 1300 for implementing a server device that can be utilized to implement aspects of the various technologies presented herein. The computer architecture shown in FIG. 13 illustrates a conventional server computer, workstation, desktop computer, laptop, tablet, network appliance, e-reader, smartphone, or other computing device, and can be utilized to execute any of the software components presented herein. The computing device 1202 may, in some examples, correspond to a physical server of a data center, the network controller 104, the administrator computing device 102, the node(s) 112, the packet switching system 1000, and/or the node 1100 described herein with respect to FIGS. 1, 10, and 11, respectively.

The server computer 1202 includes a baseboard 1302, or "motherboard," which is a printed circuit board to which a multitude of components or devices can be connected by way of a system bus or other electrical communication paths. In one illustrative configuration, one or more central processing units ("CPUs") 1304 operate in conjunction with a chipset 1306. The CPUs 1304 can be standard programmable processors that perform arithmetic and logical operations necessary for the operation of the server computer 1202.

The CPUs 1304 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based at least in part on the logical combination of the states of one or more other switching elements, such as logic gates. These basic switching elements can be combined to create more complex logic circuits, including registers, adders-subtractors, arithmetic logic units, floating-point units, and the like.

The chipset 1306 provides an interface between the CPUs 1304 and the remainder of the components and devices on the baseboard 1302. The chipset 1306 can provide an interface to a RAM 1308, used as the main memory in the server computer 1202. The chipset 1306 can further provide an interface to a computer-readable storage medium such as a read-only memory ("ROM") 1310 or non-volatile RAM ("NVRAM") for storing basic routines that help to startup the server computer 1202 and to transfer information between the various components and devices. The ROM 1310 or NVRAM can also store other software components necessary for the operation of the server computer 1202 in accordance with the configurations described herein.

The server computer 1202 can operate in a networked environment using logical connections to remote computing devices and computer systems through a network, such as the network 1324 (or 1208). The chipset 1306 can include functionality for providing network connectivity through a NIC 1312, such as a gigabit Ethernet adapter. The NIC 1312 is capable of connecting the server computer 1202 to other computing devices over the network 1324. It should be appreciated that multiple NICs 1312 can be present in the server computer 1202, connecting the computer to other types of networks and remote computer systems.

The server computer 1202 can be connected to a storage device 1318 that provides non-volatile storage for the server computer 1202. The storage device 1318 can store an operating system 1320, programs 1322, and data, which have been described in greater detail herein. The storage device 1318 can be connected to the server computer 1202 through a storage controller 1314 connected to the chipset 1306. The storage device 1318 can consist of one or more physical storage units. The storage controller 1314 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The server computer 1202 can store data on the storage device 1318 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1318 is characterized as primary or secondary storage, and the like.

For example, the server computer 1202 can store information to the storage device 1318 by issuing instructions through the storage controller 1314 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server computer 1202 can further read information from the storage device 1318 by detecting the physical states or characteristics of one or more particular locations within the physical storage units.

In addition to the mass storage device 1318 described above, the server computer 1202 can have access to other computer-readable storage media to store and retrieve information, such as program modules, data structures, or other data. It should be appreciated by those skilled in the art that computer-readable storage media is any available media that provides for the non-transitory storage of data and that can be accessed by the server computer 1202. In some examples, the operations performed by the data center 1200, and or any components included therein, may be supported by one or more devices similar to server computer 1202. Stated otherwise, some or all of the operations performed by the data center 1200, and or any components included therein, may be performed by one or more server computer 1202 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1318 can store an operating system 1320 utilized to control the operation of the server computer 1202. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 1318 can store other system or application programs and data utilized by the server computer 1202.

In one embodiment, the storage device 1318 or other computer-readable storage media is encoded with computer-executable instructions which, when loaded into the server computer 1202, transform the computer from a general-purpose computing system into a special-purpose computer capable of implementing the embodiments described herein. These computer-executable instructions transform the server computer 1202 by specifying how the CPUs 1304 transition between states, as described above. According to one embodiment, the server computer 1202 has access to computer-readable storage media storing computer-executable instructions which, when executed by the server computer 1202, perform the various processes described above with regard to FIGS. 1 through 12. The server computer 1202 can also include computer-readable storage media having instructions stored thereupon for performing any of the other computer-implemented operations described herein.

The server computer 1202 can also include one or more input/output controllers 1316 for receiving and processing input from a number of input devices, such as a keyboard, a mouse, a touchpad, a touch screen, an electronic stylus, or other type of input device. Similarly, an input/output controller 1316 can provide output to a display, such as a computer monitor, a flat-panel display, a digital projector, a printer, or other type of output device. It will be appreciated that the server computer 1202 might not include all of the components shown in FIG. 13, can include other components that are not explicitly shown in FIG. 13, or might utilize an architecture completely different than that shown in FIG. 13.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

CONCLUSION

The examples described herein provide a congestion mitigation system and method utilizing a network controller to deliver swift handling of congestion events. Congestion mitigation based on manual methods are error-prone and inefficient and being able to support automated and quick network resolutions is vital for businesses to remain viable. The present systems and methods utilize a network controller to deliver swift handling of congestion events in an automated way by offloading traffic from the congested interface and distributing the excess traffic to other alternate links on the congested node. The described systems and methods provide to organizations a toolset to help automate congestion management and steer traffic efficiently in a dynamic way while preserving operator intent in the network. Further, the described systems and methods will assist organizations in offloading complexity at the network level by transitioning real-time congestion mitigation functions onto the network controller.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A non-transitory computer-readable medium storing instructions that, when executed, causes a processor to perform operations, comprising:

obtaining data defining egress bandwidth utilization on an interface of a node;

detecting a congestion event based at least in part on an average interface utilization (Y) being greater than a first threshold ($X_1$);

determining a plurality of alternate links that can accommodate excess bandwidth without exceeding the first threshold;

identifying destination node prefixes of first filtered flows associated with the plurality of alternate links that are filtered based at least in part on business logic macro flow filtering;

determining if the plurality of alternate links pass a diffusing update algorithm (DUAL)-based loop-free path-finding algorithm (LPA) analysis for the destination node prefixes;

based at least in part on at least one of the plurality of alternate links passes the DUAL-based LPA analysis for the destination node prefixes, determining if the destination node prefixes pass the DUAL-based LPA analysis for the at least one of the plurality of alternate links and a plurality of next hops associated with the at least one of the plurality of alternate links;

based at least in part on the destination node prefixes passing the DUAL-based LPA analysis for the at least one of the plurality of alternate links and the plurality of next hops associated with the at least one of the plurality of alternate links, calculating a flow bandwidth for the first filtered flows;

filtering the first filtered flows based at least in part on the flow bandwidth to obtain second filtered flows, the second filtered flows defining a first link among the at least one of the plurality of alternate links; and implementing a mitigation plan based at least in part on the first link.

2. The non-transitory computer-readable medium of claim 1, the operations further comprising restoring the mitigation plan to a pre-mitigation state comprising:

capturing egress bandwidth utilization on the interface for which the mitigation plan is implemented;

initializing a congestion check interval ($T_C$);

determining if the average interface utilization (Y) at the interface is less than a second threshold ($X_2$) relatively lower than the first threshold ($X_1$);

based at least in part on a determination that the average interface utilization (Y) is less than the second threshold ($X_2$), capturing user input for a revertive response;

based at least in part on a determination that the average interface utilization (Y) is not less than the second threshold ($X_2$), capturing egress bandwidth utilization metrics on the interface;

based at least in part on the user input for the revertive response:

reverting traffic moving through the first link to a pre-mitigation link; and removing an access list from the node.

3. The non-transitory computer-readable medium of claim 1, the operations further comprising:

capturing egress bandwidth utilization metrics on the interface of the node; and initializing a congestion check interval ($T_C$) during which the detecting of the congestion event is performed.

4. The non-transitory computer-readable medium of claim 1, wherein the detecting of the congestion event further comprises:

based at least in part on the average interface utilization (Y) being greater than the first threshold ($X_1$), identifying the congestion event; and based at least in part on the average interface utilization (Y) not being greater than the first threshold ($X_1$), capturing egress bandwidth utilization metrics on the interface based at least in part on the average interface utilization (Y) being not greater than first threshold ($X_1$).

5. The non-transitory computer-readable medium of claim 1, the operations further comprising:
identifying the alternate links on the node;
based at least in part on a determination that the plurality of alternate links cannot accommodate excess bandwidth without exceeding the first threshold ($X_1$), recording the interface of the node for consideration for exclusion as one of the plurality of alternate links; and
excluding the interface of the node as a candidate one of the plurality of alternate links.

6. The non-transitory computer-readable medium of claim 1, the operations further comprising:
capturing user input for mitigation response;
based at least in part on a response to the user input, identifying excess bandwidth (Z) where the excess bandwidth (Z) is equal to the average interface utilization (Y) minus the first threshold ($X_1$); and
identifying all flows passing through the interface during a congestion check interval ($T_C$);
obtaining destination addresses of the first filtered flows; and
identifying the destination node prefixes from the destination addresses.

7. The non-transitory computer-readable medium of claim 1, the operations further comprising:
capturing user input for mitigation response;
based at least in part on a response to the user input, identifying excess bandwidth (Z) where the excess bandwidth (Z) is equal to the average interface utilization (Y) minus the first threshold ($X_1$); and
identifying all flows passing through the interface in a congestion check interval ($T_C$); and
identifying the destination node prefixes for the first filtered flows using flow top label to prefix mapping.

8. The non-transitory computer-readable medium of claim 1, the operations further comprising:
based at least in part on the plurality of alternate links not passing the DUAL-based LPA analysis for the destination node prefixes:
recording the interface of the node for consideration for exclusion as one of the plurality of alternate links; and
excluding the interface of the node as a candidate one of the plurality of alternate links.

9. The non-transitory computer-readable medium of claim 1, the operations further comprising, based at least in part on a first one of the destination node prefixes not passing the DUAL-based LPA analysis for the plurality of alternate links and the plurality of next hops associated with the plurality of alternate links, excluding at least one of the first filtered flows corresponding to the first one of the destination node prefixes.

10. The non-transitory computer-readable medium of claim 1, the operations further comprising:
based at least in part on a first one of the destination node prefixes passing the DUAL-based LPA analysis for the plurality of alternate links and the plurality of next hops associated with the plurality of alternate links, recording at least one of the first filtered flows corresponding to the first one of the destination node prefixes as a candidate for flow mitigation;
calculating flow bandwidths for the recorded first filtered flows in a congestion check interval ($T_C$) time window;
arranging the recorded first filtered flows in ascending order of the flow bandwidths;
presenting the mitigation plan to a user;
based at least in part on a response from the user regarding the mitigation plan:
pushing flow information to an access list of the node; and
enabling the mitigation plan based on the access list.

11. The non-transitory computer-readable medium of claim 1, wherein the filtering of the first filtered flows based at least in part on the flow bandwidth to obtain the second filtered flows comprises filtering the first filtered flows that have bandwidth that is cumulatively equal to or rounded to a higher value of excess traffic (Z).

12. A network controller comprising:
a processor; and
a non-transitory computer-readable media storing instructions that, when executed by the processor, causes the processor to perform operations comprising:
obtaining data defining egress bandwidth utilization on an interface of a node;
detecting a congestion event based at least in part on an average interface utilization (Y) being greater than a first threshold ($X_1$);
determining a plurality of alternate links that can accommodate excess bandwidth without exceeding the first threshold;
identifying destination node prefixes of first filtered flows associated with the plurality of alternate links that are filtered based at least in part on business logic macro flow filtering;
determining if the plurality of alternate links pass a diffusing update algorithm (DUAL)-based loop-free path-finding algorithm (LPA) analysis for the destination node prefixes;
based at least in part on at least one of the plurality of alternate links passes the DUAL-based LPA analysis for the destination node prefixes, determining if the destination node prefixes pass the DUAL-based LPA analysis for the at least one of the plurality of alternate links and a plurality of next hops associated with the at least one of the plurality of alternate links;
based at least in part on the destination node prefixes passing the DUAL-based LPA analysis for the at least one of the plurality of alternate links and the plurality of next hops associated with the at least one of the plurality of alternate links, calculating a flow bandwidth for the first filtered flows;
filtering the first filtered flows based at least in part on the flow bandwidth to obtain second filtered flows, the second filtered flows defining a first link among the at least one of the plurality of alternate links; and
implementing a mitigation plan based at least in part on the first link.

13. The network controller of claim 12, the operations further comprising restoring the mitigation plan to a pre-mitigation state comprising:
capturing egress bandwidth utilization on the interface for which the mitigation plan is implemented;
initializing a congestion check interval ($T_C$);
determining if the average interface utilization (Y) at the interface is less than a second threshold ($X_2$) relatively lower than the first threshold ($X_1$);

based at least in part on a determination that the average interface utilization (Y) is less than the second threshold ($X_2$), capturing user input for a revertive response;

based at least in part on a determination that the average interface utilization (Y) is not less than the second threshold ($X_2$), capturing egress bandwidth utilization metrics on the interface;

based at least in part on the user input for the revertive response:
  reverting traffic moving through the first link to a pre-mitigation link; and
  removing an access list from the node.

14. The network controller of claim 12, the operations further comprising:
  capturing egress bandwidth utilization metrics on the interface of the node;
  initializing a congestion check interval ($T_C$) during which the detecting of the congestion event is performed;
  based at least in part on the average interface utilization (Y) being greater than the first threshold ($X_1$), identifying the congestion event;
  based at least in part on the average interface utilization (Y) not being greater than the first threshold ($X_1$), capturing egress bandwidth utilization metrics on the interface based at least in part on the average interface utilization (Y) being not greater than first threshold ($X_1$);
  capturing user input for mitigation response;
  based at least in part on a response to the user input, identifying excess bandwidth (Z) where the excess bandwidth (Z) is equal to the average interface utilization (Y) minus the first threshold ($X_1$);
  identifying all flows passing through the interface during a congestion check interval ($T_C$); and
  identifying the destination node prefixes.

15. The network controller of claim 12, the operations further comprising:
  based at least in part on a first one of the destination node prefixes passing the DUAL-based LPA analysis for the plurality of alternate links and the plurality of next hops associated with the plurality of alternate links, recording at least one of the first filtered flows corresponding to the first one of the destination node prefixes as a candidate for flow mitigation;
  calculating flow bandwidths for the recorded first filtered flows in a congestion check interval ($T_C$) time window;
  arranging the recorded first filtered flows in ascending order of the flow bandwidths;
  presenting the mitigation plan to a user;
  based at least in part on a response from the user regarding the mitigation plan:
    pushing flow information to an access list of the node; and
    enabling the mitigation plan based on the access list.

16. A method of congestion mitigation, comprising:
  obtaining data defining egress bandwidth utilization on an interface of a node;
  detecting a congestion event based at least in part on an average interface utilization (Y) being greater than a first threshold ($X_1$);
  determining a plurality of alternate links that can accommodate excess bandwidth without exceeding the first threshold;
  identifying destination node prefixes of first filtered flows associated with the plurality of alternate links that are filtered based at least in part on business logic macro flow filtering;
  determining if the plurality of alternate links pass a diffusing update algorithm (DUAL)-based loop-free path-finding algorithm (LPA) analysis for the destination node prefixes;
  based at least in part on at least one of the plurality of alternate links passes the DUAL-based LPA analysis for the destination node prefixes, determining if the destination node prefixes pass the DUAL-based LPA analysis for the at least one of the plurality of alternate links and a plurality of next hops associated with the at least one of the plurality of alternate links;
  based at least in part on the destination node prefixes passing the DUAL-based LPA analysis for the at least one of the plurality of alternate links and the plurality of next hops associated with the at least one of the plurality of alternate links, calculating a flow bandwidth for the first filtered flows;
  filtering the first filtered flows based at least in part on the flow bandwidth to obtain second filtered flows, the second filtered flows defining a first link among the at least one of the plurality of alternate links; and
  implementing a mitigation plan based at least in part on the first link.

17. The method of claim 16, further comprising restoring the mitigation plan to a pre-mitigation state comprising:
  capturing egress bandwidth utilization on the interface for which the mitigation plan is implemented;
  initializing a congestion check interval ($T_C$);
  determining if the average interface utilization (Y) at the interface is less than a second threshold ($X_2$) relatively lower than the first threshold ($X_1$);
  based at least in part on a determination that the average interface utilization (Y) is less than the second threshold ($X_2$), capturing user input for a revertive response;
  based at least in part on a determination that the average interface utilization (Y) is not less than the second threshold ($X_2$), capturing egress bandwidth utilization metrics on the interface;
  based at least in part on the user input for the revertive response:
    reverting traffic moving through the first link to a pre-mitigation link; and
    removing an access list from the node.

18. The method of claim 16, further comprising:
  capturing egress bandwidth utilization metrics on the interface of the node;
  initializing a congestion check interval ($T_C$) during which the detecting of the congestion event is performed;
  based at least in part on the average interface utilization (Y) being greater than the first threshold ($X_1$), identifying the congestion event;
  based at least in part on the average interface utilization (Y) not being greater than the first threshold ($X_1$), capturing egress bandwidth utilization metrics on the interface based at least in part on the average interface utilization (Y) being not greater than first threshold ($X_1$);
  capturing user input for mitigation response;
  based at least in part on a response to the user input, identifying excess bandwidth (Z) where the excess bandwidth (Z) is equal to the average interface utilization (Y) minus the first threshold ($X_1$);
  identifying all flows passing through the interface during a congestion check interval ($T_C$); and
  identifying the destination node prefixes.

19. The method of claim 16, further comprising:
based at least in part on a first one of the destination node prefixes passing the DUAL-based LPA analysis for the plurality of alternate links and the plurality of next hops associated with the plurality of alternate links, recording at least one of the first filtered flows corresponding to the first one of the destination node prefixes as a candidate for flow mitigation;
calculating flow bandwidths for the recorded first filtered flows in a congestion check interval ($T_C$) time window;
arranging the recorded first filtered flows in ascending order of the flow bandwidths;
presenting the mitigation plan to a user;
based at least in part on a response from the user regarding the mitigation plan:
   pushing flow information to an access list of the node; and
   enabling the mitigation plan based on the access list.

20. The method of claim 16, wherein the filtering of the first filtered flows based at least in part on the flow bandwidth to obtain the second filtered flows comprises filtering the first filtered flows that have bandwidth that is cumulatively equal to or rounded to a higher value of excess traffic ($Z$).

\* \* \* \* \*